US008135125B2

(12) United States Patent
Sidhu et al.

(10) Patent No.: US 8,135,125 B2
(45) Date of Patent: Mar. 13, 2012

(54) MULTI-PARTY INFORMATION ANALYSIS IN A VOIP SYSTEM

(75) Inventors: Gursharan S Sidhu, Seattle, WA (US); Kuansan Wang, Bellevue, WA (US); Michael D Malueg, Renton, WA (US); Scott C Forbes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1162 days.

(21) Appl. No.: 11/431,957

(22) Filed: May 10, 2006

(65) Prior Publication Data
US 2007/0265990 A1 Nov. 15, 2007

(51) Int. Cl.
H04M 5/00 (2006.01)

(52) U.S. Cl. ........... 379/265.03; 379/265.13; 379/266.1; 379/266.06; 379/265.02

(58) Field of Classification Search ............. 379/265.11, 379/265.12, 265.13, 266.01, 266.02, 266.07, 379/266.08, 268.03, 265.03, 265.02, 266.1
See application file for complete search history.

(56) References Cited

U.S. PATENT DOCUMENTS

| 5,884,032 | A | 3/1999 | Bateman et al. ............... 709/204 |
| 6,411,687 | B1 * | 6/2002 | Bohacek et al. ............ 379/88.21 |
| 6,442,547 | B1 | 8/2002 | Bowman-Amuah ............ 707/10 |
| 6,625,258 | B1 | 9/2003 | Ram et al. ................... 379/88.13 |
| 6,671,355 | B1 | 12/2003 | Spielman et al. .......... 379/88.12 |
| 6,704,303 | B1 | 3/2004 | Bowman-Amuah .......... 370/352 |
| 7,149,301 | B2 | 12/2006 | Yoshida et al. .......... 379/218.01 |
| 7,231,404 | B2 | 6/2007 | Paila et al. ................. 707/104.1 |
| 7,376,129 | B2 | 5/2008 | Acharya et al. ............... 370/352 |
| 7,426,538 | B2 | 9/2008 | Bodin et al. ................... 709/204 |
| 7,443,834 | B1 | 10/2008 | Sylvain .......................... 370/352 |
| 7,509,124 | B2 | 3/2009 | O'Neil ........................ 455/432.2 |
| 7,724,743 | B2 | 5/2010 | Razdan et al. ................. 370/392 |
| 7,774,790 | B1 * | 8/2010 | Jirman et al. ................. 719/318 |
| 7,983,247 | B2 | 7/2011 | Howell et al. ................. 370/352 |
| 2002/0035474 | A1 | 3/2002 | Alpdemir ...................... 704/270 |
| 2002/0085696 | A1 | 7/2002 | Martin et al. ............. 379/201.03 |
| 2003/0172175 | A1 | 9/2003 | McCormack et al. ........ 709/232 |
| 2003/0215078 | A1 | 11/2003 | Brahm et al. ............ 379/211.02 |

(Continued)

FOREIGN PATENT DOCUMENTS

EP 1 107 549 6/2001

(Continued)

OTHER PUBLICATIONS

AudioTX Communicator, "What is Communicator?" ISDN Codec and Audio over IP Network Software Solution; accessed Jun. 2, 2006 at http://www.audiotx.com/main.html.

(Continued)

Primary Examiner — Antim Shah
(74) Attorney, Agent, or Firm — Merchant & Gould

(57) ABSTRACT

A system and method for collecting contextual information from several parties and generating an analyzed response to the contextual information is provided. Multiple sets of contextual information may be received from one or more clients. Relevant contextual information may be identified and pushed into a module which is configured to aggregate the relevant contextual information until it meets its threshold within a predetermined period. A set of events relating to the relevant contextual information may be generated to execute appropriate actions. The appropriate actions may include notifying a potential problem or an issue, providing a known solution, and so on. In this manner, contextual data from multiple parties can be analyzed to identify potential issues/problems that are frequently reported.

20 Claims, 22 Drawing Sheets

U.S. PATENT DOCUMENTS

| | | | |
|---|---|---|---|
| 2004/0141508 A1 | 7/2004 | Schoeneberger et al. | 370/401 |
| 2004/0258216 A1 | 12/2004 | Reid | 379/88.13 |
| 2005/0039216 A1 | 2/2005 | Oota | 725/111 |
| 2005/0044197 A1 | 2/2005 | Lai | 709/223 |
| 2005/0281284 A1 | 12/2005 | Shim et al. | 370/465 |
| 2005/0286711 A1 | 12/2005 | Lee et al. | 379/399.01 |
| 2006/0015580 A1 | 1/2006 | Gabriel et al. | 709/219 |
| 2006/0077956 A1 | 4/2006 | Saksena et al. | 370/352 |
| 2006/0153357 A1* | 7/2006 | Acharya et al. | 379/266.01 |
| 2007/0230443 A1 | 10/2007 | Milstein et al. | 370/352 |
| 2007/0239685 A1 | 10/2007 | Howell et al. | 707/3 |
| 2007/0265830 A1 | 11/2007 | Sidhu et al. | 704/9 |
| 2007/0280204 A1 | 12/2007 | Howell et al. | 370/352 |
| 2008/0052400 A1 | 2/2008 | Ekberg | 709/227 |
| 2008/0101339 A1 | 5/2008 | Forbes et al. | 370/352 |
| 2009/0083426 A1 | 3/2009 | Cagenius | 709/227 |

FOREIGN PATENT DOCUMENTS

| | | |
|---|---|---|
| EP | 1 548 997 | 6/2005 |

OTHER PUBLICATIONS

Cisco Systems, "IP Phones for all Business Environments," Cisco 7900Series IP Phones—Products and Services—Cisco Systems, access Feb. 2, 2006 at http://www.cisco.com/en/US/products/hw/phones/ps379.index.html.

Office Action dated Apr. 1, 2010, issued in U.S. Appl. No. 11/444,746.
Office Action dated Feb. 2, 2010, issued in U.S. Appl. No. 11/432,163.
Office Action dated Jan. 11, 2010, issued in U.S. Appl. No. 11/400,612.
Office Action dated Jun. 10, 2009, issued in U.S. Appl. No. 11/400,612.
Office Action dated Jun. 9, 2009, issued in U.S. Appl. No. 11/444,746.
Office Action dated May 12, 2008, issued in U.S. Appl. No. 11/400,612.
Office Action dated Nov. 25, 2008, issued in U.S. Appl. No. 11/400,612.
Office Action dated Nov. 28, 2008, issued in U.S. Appl. No. 11/444,746.
Office Action dated Sep. 29, 2009, issued in U.S. Appl. No. 11/444,746.
Office Action dated Feb. 1, 2011, issued in U.S. Appl. No. 11/555,587.
Office Action dated Feb. 2, 2011, issue in U.S. Appl. No. 11/444,746.
Office Action dated Jul. 19, 2010, issued in U.S. Appl. No. 11/432,163.
Office Action dated Aug. 25, 2010, issued in U.S. Appl. No. 11/444,746.

* cited by examiner

MULTI-PARTY INFORMATION ANALYSIS IN A VOIP SYSTEM

BACKGROUND

Generally described, an Internet telephony system provides an opportunity for users to have a call connection with enhanced calling features compared to a conventional Public Switched Telephone Network (PSTN) based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide. However, the current VoIP approach may not provide a way to collectively analyze contextual information received from several calling parties.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method for collecting contextual information from several parties and generating an analyzed response to the contextual information is provided. Multiple sets of contextual information may be received from one or more clients. Relevant contextual information may be identified and pushed into a module which is configured to aggregate the relevant contextual information until it meets its threshold within a predetermined period. A set of events relating to the relevant contextual information may be generated to execute appropriate actions. The appropriate actions may include notifying a potential problem or an issue, providing a known solution, and so on. In this manner, contextual data from multiple parties can be analyzed to identify potential issues/problems that are frequently reported.

In an aspect of the present invention, a method of collecting and analyzing contextual information relating to several clients is provided. The contextual information may be received from clients, service providers, or third party providers. Any relevant contextual information may be identified from the received contextual information based on predefined factors or rules. In one embodiment, multiple sets of contextual information may be received and a common subset of contextual information such as a common subject, similar problems, etc., may be identified as relevant contextual information. The identified contextual information may be pushed to an aggregator agent module which is suitable for aggregating a part or all of the pushed contextual information and monitoring whether the aggregated information meets its corresponding threshold. A set of events may be received from the aggregator agent module when the aggregated information exceeds the threshold. The threshold associated with the relevant contextual information may be predetermined and can be dynamically changed. The set of events may correspond to an appropriate action based on an analysis of the relevant contextual information. An example of the responses includes a notification of a problem commonly experienced in a certain number of clients, an issue discussed with a certain number of clients, a possible solution for the common problem, or the like.

In another aspect of the present invention, a method of aggregating information received from several clients and analyzing the aggregated information is provided. Multiple sets of contextual information may be received from one or more clients. The received contextual information may be filtered into aggregated contextual information. In one embodiment, only relevant contextual information may be passed through a filter and the relevant contextual information may then be aggregated. A threshold corresponding to the aggregated contextual information may be identified. In one embodiment, a predetermined time period may be associated with the threshold. The level of aggregation of relevant contextual information may be monitored to detect whether the aggregated contextual information exceeds its corresponding threshold. When the aggregated contextual information exceeds its corresponding threshold, a set of events may be generated and provided. Upon generating the set of events, information relating to the aggregated contextual information may be logged and stored. The aggregated contextual information and the threshold may be cleared (reset) for a new analysis. The threshold can be dynamically changed for a different analysis. Additional aggregation may be done to analyze the relevant contextual information in light of the changed threshold. Further, the received contextual information may be analyzed to see whether there is a pattern of similarity. If such pattern is detected, the received contextual information having such pattern is aggregated and, if the aggregation exceeds a corresponding threshold, a set of events is generated.

In another aspect of the present invention, a computer-readable medium having computer-executable components for collecting contextual information from several clients and generating an analyzed response to the contextual information is provided. The computer-readable medium includes an interface component for receiving multiple sets of contextual information, and a filtering component for identifying relevant contextual information based on predefined factors. The computer-readable medium further includes an aggregator component for aggregating the identified contextual information up to a threshold, monitoring whether the aggregation exceeds the threshold, and generating a set of events. The interface component pushes the identified contextual information to the aggregator component. The computer-readable medium also includes a storage component for storing information relating to the aggregation, the received contextual information, the set of events, the value of the threshold or the time/date stamp. The storage component may maintain contextual information relating to each client. The interface component may continue collecting and/or obtaining additional contextual information relating to the several clients. The filtering component may select a set of criteria to determine relevant information among the multiple sets of the contextual information. Several set of criteria can be predefined and/or dynamically updated.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to a method and system for analyzing information relating to a service requested by several VoIP clients or other service providers over a communication channel. More specifically, the present invention relates to a method and system for identifying relevant contextual information received from multiple VoIP clients, collecting the identified contextual information represented according to "structured hierarchies," and recognizing potential issues based on the collected contextual information. "Structured hierarchies," as used herein, are predefined organizational structures for arranging contextual information to be exchanged between two or more VoIP devices. For example, structured hierarchies may be XML namespaces. Further, a VoIP conversation includes one or more data streams of information related to a conversation, such as contextual information and voice/multimedia information, exchanged over a conversation channel. Suitable user interfaces adaptive to contextual information may be utilized to collect further contextual information. Although the present invention will be described with relation to illustrative structured hierarchies and an IP telephony environment, one skilled in the relevant art will appreciate that the disclosed embodiments are illustrative in nature and should not be construed as limiting.

Figure 1:
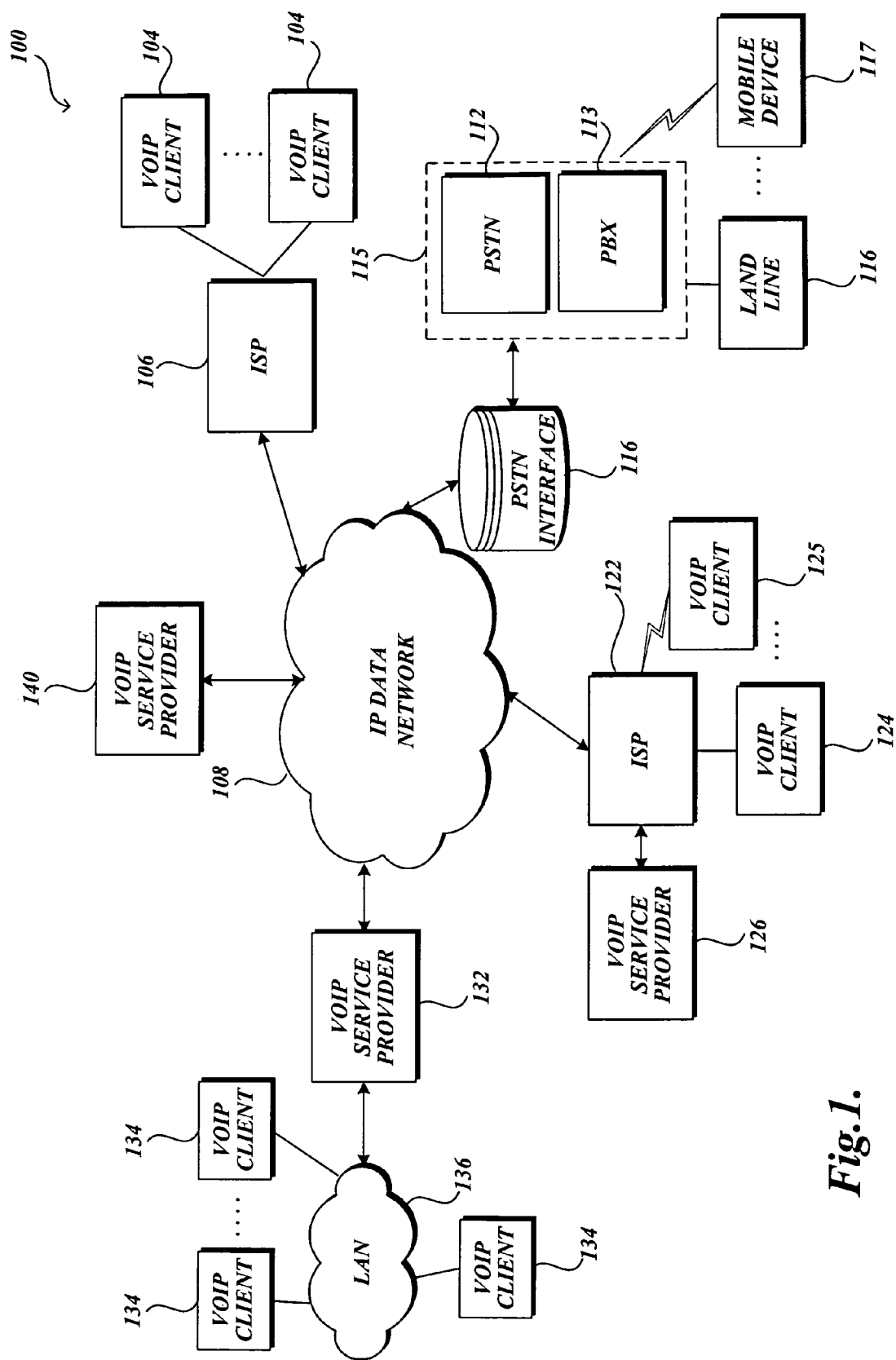
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a company, etc., one or more associated VoIP devices and a unique VoIP client identifier. For example, a single individual, five associated VoIP devices and a unique VoIP client identifier may collectively makeup a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live where each individual is associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN), and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP call conversation. VoIP clients 104, 124, 125, 136 may create, maintain, and provide information relating to predetermined priorities for incoming calls. In addition, the VoIP service providers 126, 132, 140 may also generate, maintain, and provide a separated set of metadata information (e.g., provider priority list) for individuals communicating in a call conversation. The VoIP service providers 126, 132, 140 may determined and assign an appropriate priority level to data packets based on priority information provided by VoIP clients 104, 124, 125, 136 in conjunction with the provider priority list.

VoIP service providers 132 may be coupled to a private network such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 via PSTN 112, or Private Branch exchange (PBX) 113. A PSTN interface 114 such as a PSTN gateway may provide access between POTS/PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116 may request a connection with the VoIP client based on the unique client identifier of that client and the appropriate VoIP device associated with the VoIP client, will be used to establish a connection. In one example, an individual associated with the VoIP client may specify which devices are to be used in connecting a call based on a variety of conditions (e.g., connection based on the calling party, the time of day, etc.).

It is understood that the above-mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
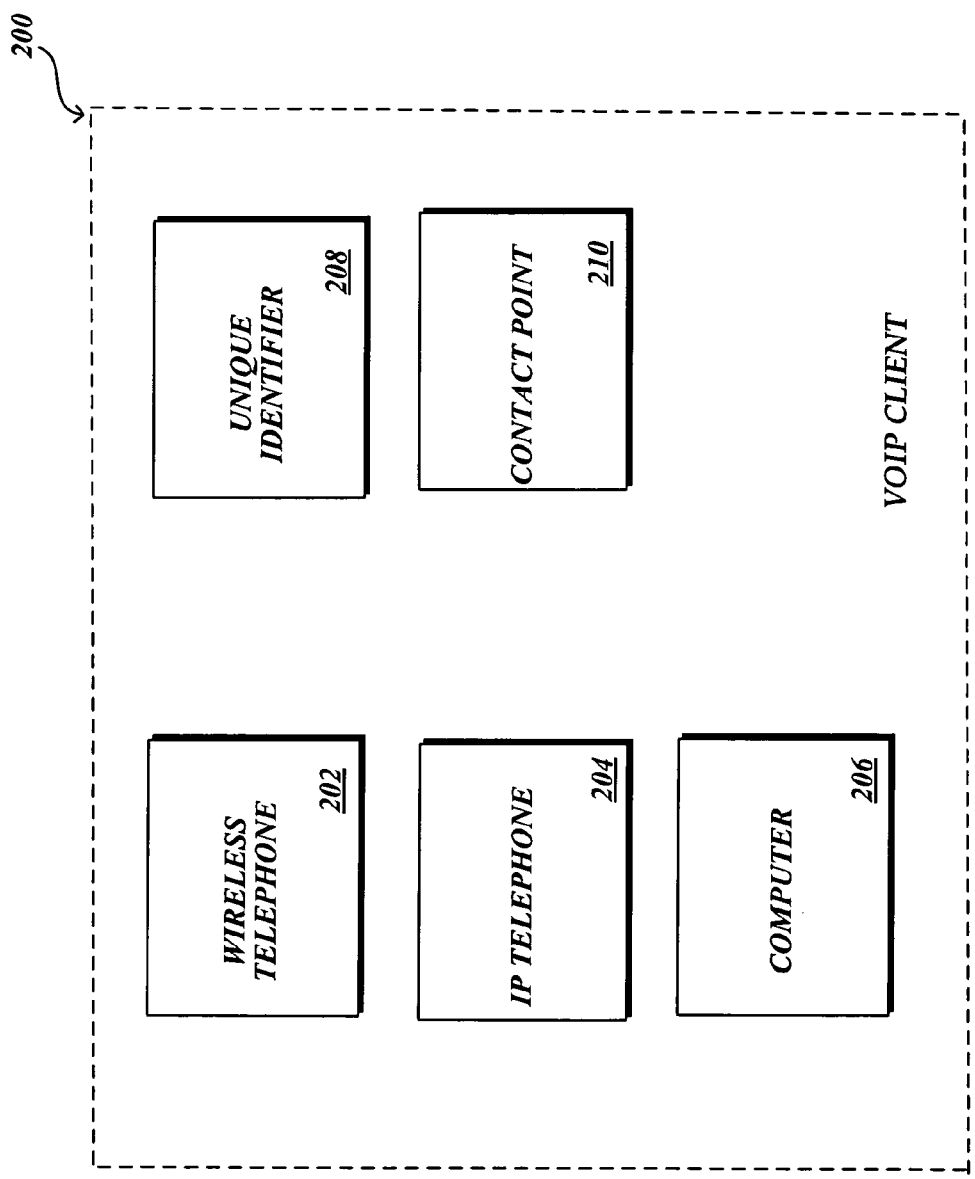
FIG. 2 is a block diagram illustrative of a VoIP client in accordance with an aspect of the present invention.

Referring now to FIG. 2, a block diagram illustrating an exemplary VoIP client 200 that includes several VoIP devices and a unique client identifier, in accordance with an embodiment of the present invention, is shown. Each VoIP device 202, 204, 206 may include a storage that is used to maintain voice messages, address books, client specified rules, priority information related to incoming calls, etc. Alternatively, or in addition thereto, a separate storage, maintained for example by a service provider, may be associated with the VoIP client and accessible by each VoIP device that contains information relating to the VoIP client. In an embodiment, any suitable VoIP device such as a wireless phone 202, an IP phone 204, or a computer 206 with proper VoIP applications may be part of the VoIP client 200. The VoIP client 200 also maintains one or more unique client identifiers 208. The unique client identifier(s) 208 may be constant or change over time. For example, the unique client identifier(s) 208 may change with each call. The unique client identifier is used to identify the client and to connect with the contact point 210 associated with the VoIP client. The unique client identifier may be maintained on each VoIP device included in the VoIP client and/or maintained by a service provider that includes an association with each VoIP device included in the VoIP client. In the instance in which the unique client identifier is maintained by a service provider, the service provider may include information about each associated VoIP device and knowledge as to which device(s) to connect for incoming communications. In an alternative embodiment, the VoIP client 200 may maintain multiple client identifiers. In this embodiment, a unique client identifier may be temporarily assigned to the VoIP client 200 for each call session.

The unique client identifier may be used similar to a telephone number in PSTN. However, instead of dialing a typical telephone number to ring a specific PSTN device, such as a home phone, the unique client identifier is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
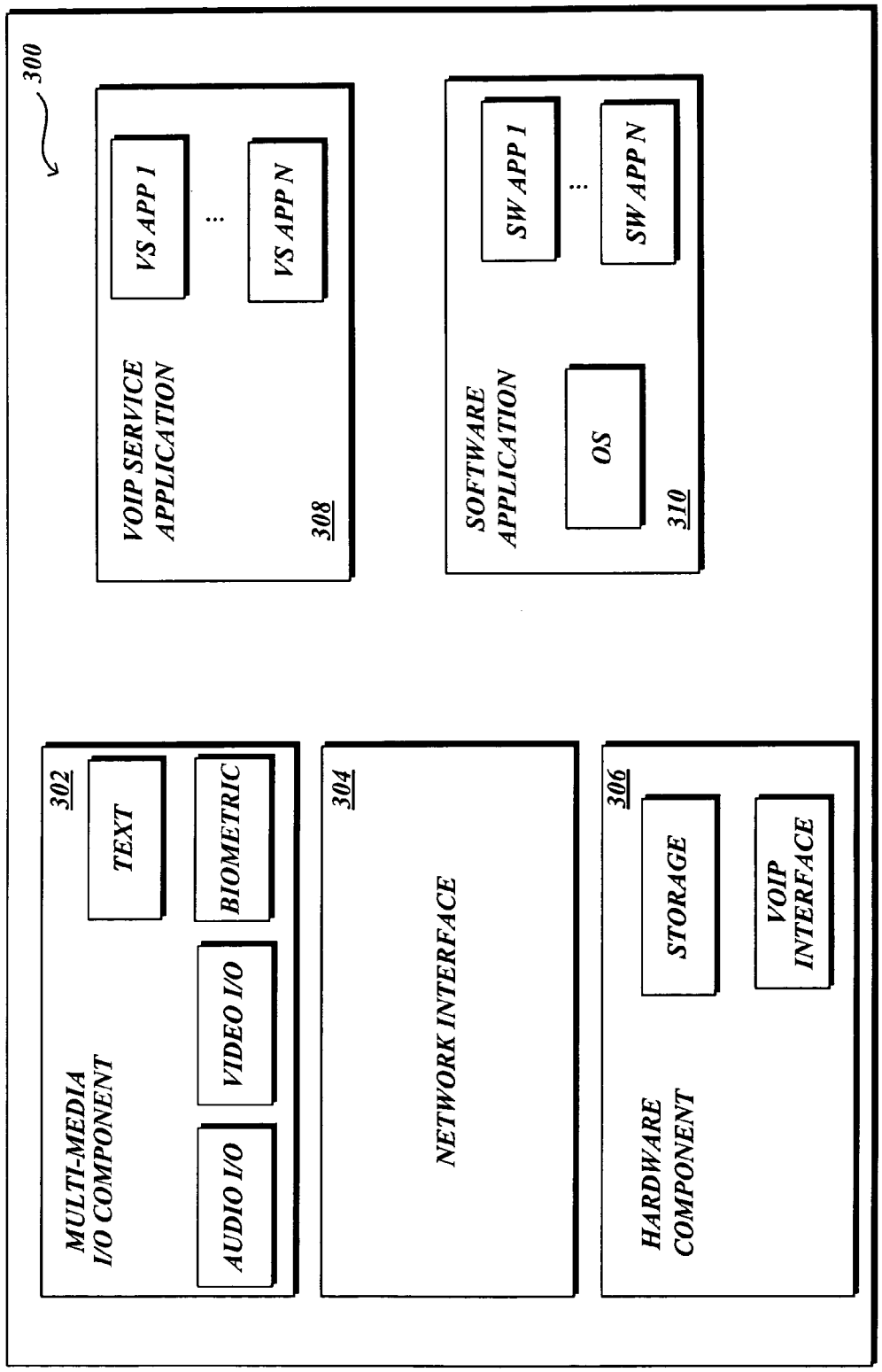
FIG. 3 is a block diagram illustrative of various components associated with a VoIP device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc.

The multimedia input/output component 302 may include any suitable user input/output components such as a microphone, a video camera, a display screen, a keyboard, user biometric recognition devices, and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications, and to store contextual information related to individuals (e.g., voice profiles, user biometrics information, etc.) associated with the VoIP client in which the device is included. In one embodiment, the hardware component 306 may include a VoIP interface card which allows a non-VoIP client device to transmit and receive a VoIP conversation.

The device 300 may further include a software application component 310 for the operation of the device 300 and a VoIP Service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio.

Figure 4:
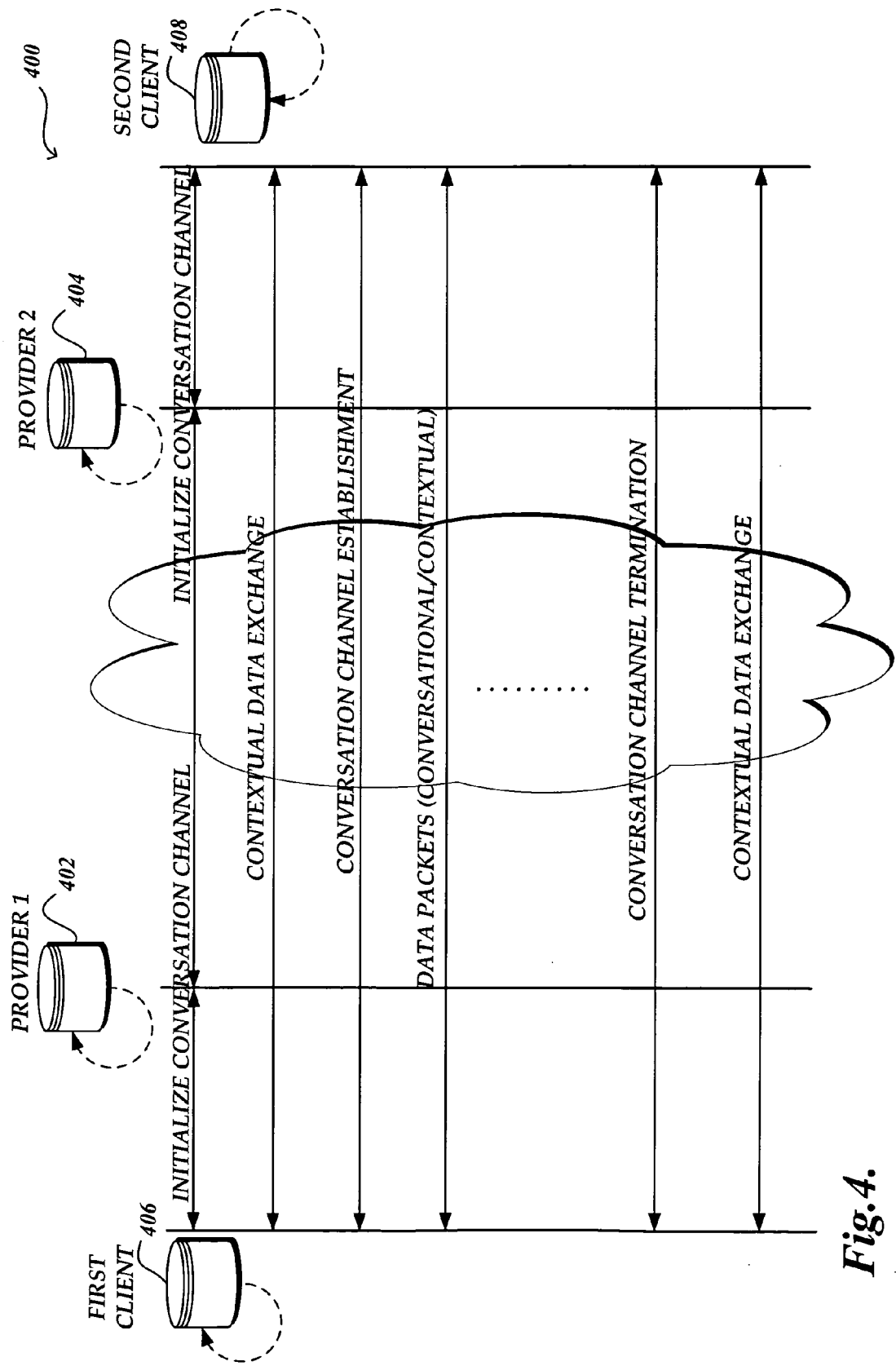
FIG. 4 is a block diagram illustrative of the exchange of data between two VoIP clients over a conversation channel in accordance with an aspect of the present invention.

With reference to FIG. 4, a block diagram illustrative of a conversation flow 400 between VoIP devices of two different VoIP clients over a conversation channel, in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There are a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, we will utilize the example in which, the first VoIP client 406 and the second VoIP client 408, each includes only one VoIP device. Accordingly, the discussion provided herein will refer to connection of the two VoIP devices. The individual using the device of the first VoIP client 406 may select or enter the unique client identifier of the client that is to be called. Provider 1 402 receives the request from the device of the first VoIP client 408 and determines a terminating service provider (e.g., Provider 2 404 of the second VoIP client 408) based on the unique client identifier included in the request. The request is then forwarded to Provider 2 404. This call initiation will be forwarded to the device of the second VoIP client. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client 406, the device, and the VoIP client 408 being called.

Available media types, rules of the calling client and the client being called, and the like, may also be part of the contextual information that is exchanged during the connection set-up phase. The contextual information may be processed and collected by one of the devices of the first VoIP client 406, one of the devices of the second VoIP client 408, and/or by the VoIP service providers (e.g., Provider 1 402 and Provider 2 404), depending on the nature of the contextual information. In one embodiment, the VoIP service providers 402, 404 may add/delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail below, the data packets, including conversation data packets and contextual data packets, are communicated over the established conversation channel between the connected devices.

Conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 5:
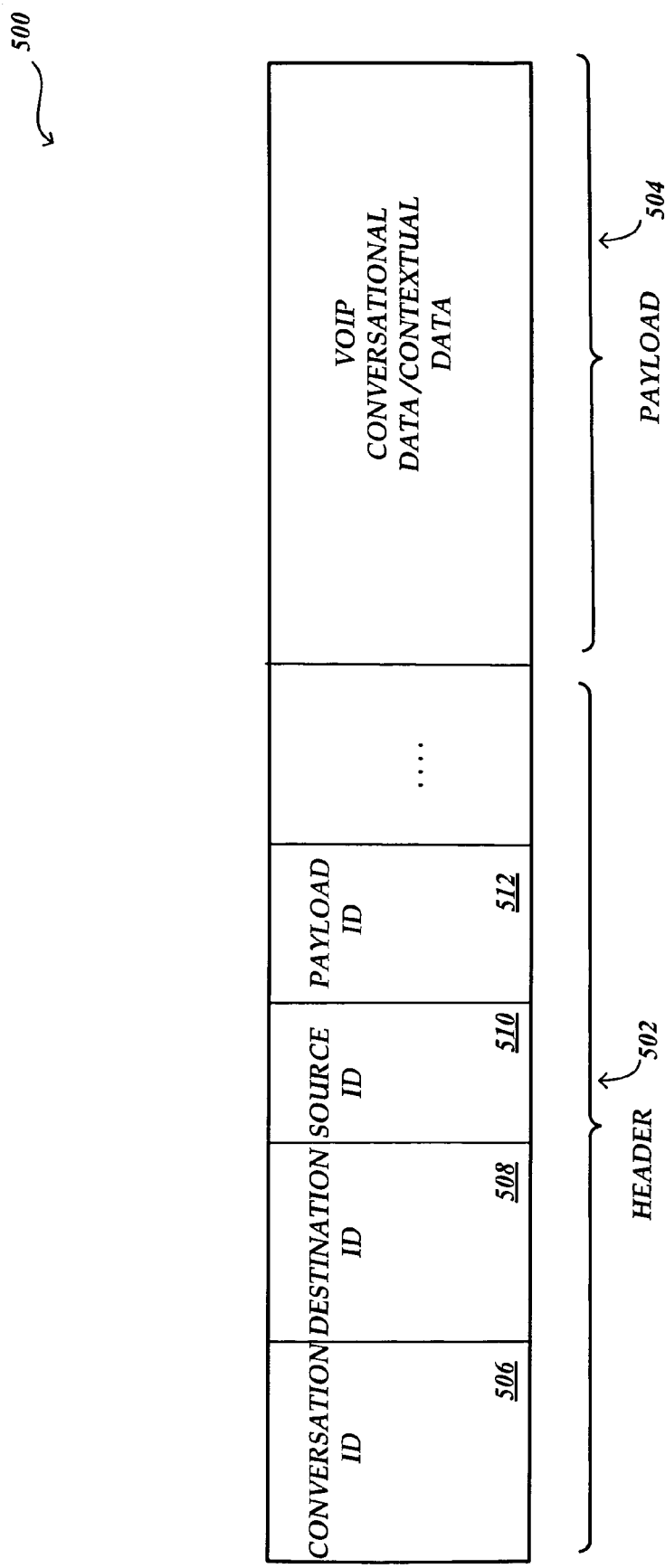
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504. The header 502 may contain information necessary to deliver the corresponding data packet to a destination. Additionally, the header 502 may include information utilized in the process of a conversation. Such information may include conversation ID 506 for identifying a conversation (e.g., call), a Destination ID 508, such as a unique client identifier of the client being called, a Source ID 510 (unique client identifier of the calling client or device identifier), Payload ID 512 for identifying the type of payload (e.g., conversation or contextual), individual ID (not shown) for identifying the individual to which the conversation data is related, and the like. In an alternative embodiment, the header 502 may contain information regarding Internet protocol versions, and payload length, among others. The payload 504 may include conversational or contextual data relating to an identified conversation. As will be appreciated by one of ordinary skill in the art, additional headers may be used for upper layer headers such as a TCP header, a UDP header, and the like.

In one embodiment of the present invention, a structured hierarchy may be predefined for communicating contextual information over a VoIP conversation channel. The contextual information may include any information relating to VoIP clients, VoIP devices, conversation channel connections (e.g., call basics), conversation context (e.g., call context), and the like. More specifically, the contextual information may include client preference, client rules, client's location (e.g., user location, device location, etc.), biometrics information, the client's confidential information, VoIP device's functionality, VoIP service provider's information, media type, media parameters, calling number priority, keywords, information relating to application files, and the like. The contextual information may be processed and collected at each VoIP client and/or the VoIP service providers depending on the nature of the contextual data. In one aspect, the VoIP service providers may add, modify and/or delete the VoIP client's contextual data before forwarding the contextual information. For example, client's confidential information will be deleted by the VoIP service provider associated with that client unless the client authorizes such information to be transmitted. In some cases, a minimal amount of contextual information is transmitted outside of an intranet network.

Figure 6:
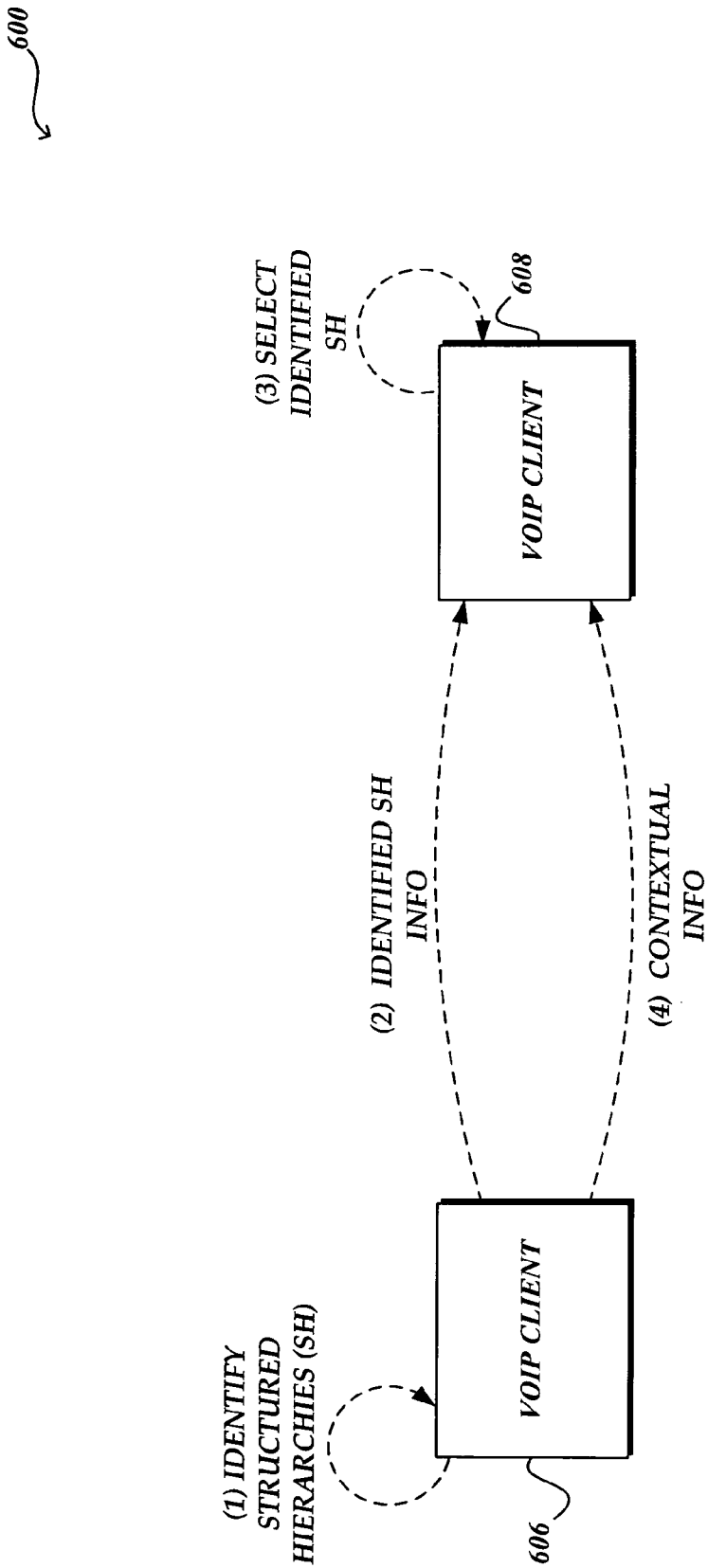
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two VoIP clients for transferring contextual information, in accordance with an embodiment of the present invention, is shown. As with FIG. 4, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by VoIP Client 606. The information regarding the identified structured hierarchies may include information about which structured hierarchies are used to carry the contextual information, how to identify the structured hierarchy, and the like. Such information will be exchanged between VoIP Client 606 and VoIP Client 608 before the corresponding contextual information is exchanged. Upon receipt of the information identifying which structured hierarchy will be used to carry the contextual information, VoIP Client 608 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to VoIP Client 608.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchy, VoIP Client 608 is expecting to receive a data stream such that data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information.

Figure 7A:
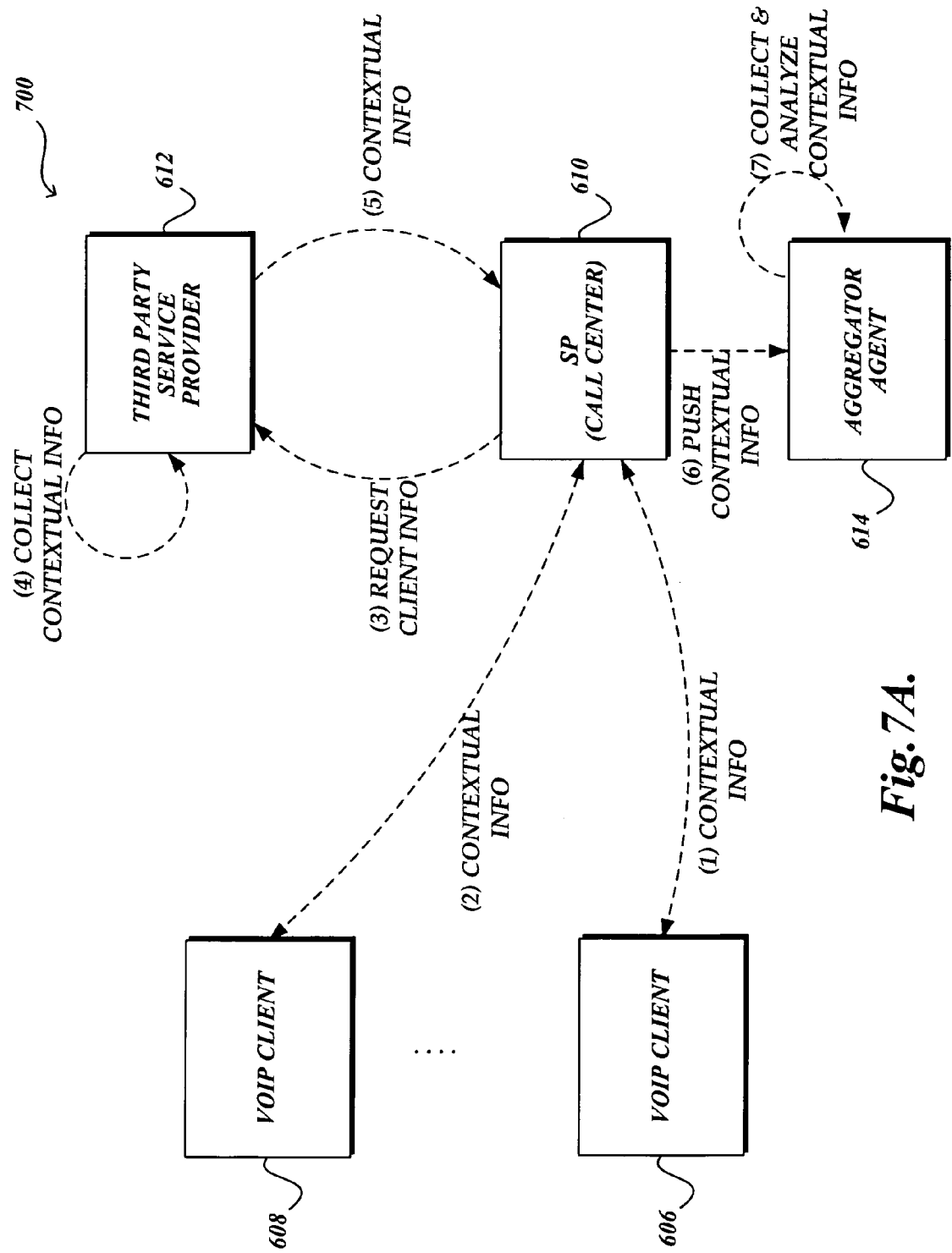
FIGS. 7A and 7B are block diagrams illustrating interactions between VoIP entities for collecting and routing contextual information to a destination in accordance with an aspect of the present invention.
Figure 7B:
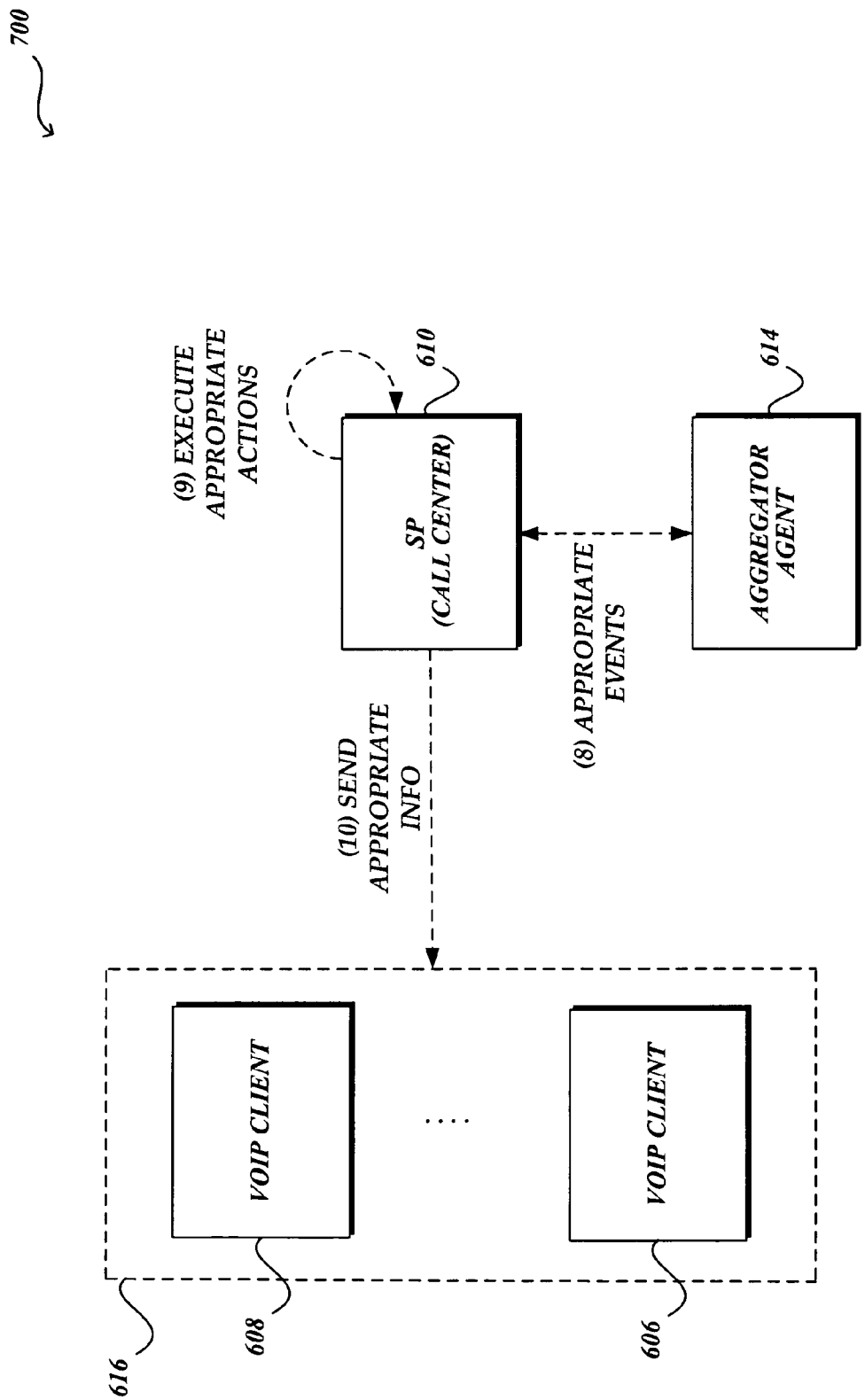

FIGS. 7A and 7B are block diagrams 700 illustrating the collection, and analyzing of contextual information from multiple VoIP clients in accordance with an embodiment of the present invention. As will be discussed in greater detail below, interaction among the VoIP entities may be illustrated by the block diagrams 700. In one embodiment, the VoIP entities may include VoIP clients, VoIP service providers for the clients, third party service providers, and the like.

With reference to FIG. 7A, in one embodiment, VoIP Client 608 may send a signal to initiate a call request to a Service Provider (SP) 610. SP 610 may be a service provider on premises (e.g., part of a client if the client is a corporation) or a service provider off premises (an external service provider). As will be described in greater detail below, SP 610 may be any VoIP related service provider, including a call center, a customer support center, a VoIP service provider, an interactive E-commerce server, a centralized client information management server, and the like. Likewise, a signal may be initiated for a call to seek services which can be provided by SP 610. For example, a user may wish to have a conversation with customer service personnel regarding problems in a VoIP device or a VoIP call in a call center environment.

For discussion purposes, assume that several VoIP clients (VoIP Client 606, VoIP Client 608) have a prearranged agreement with SP 610 (e.g., a call center) for obtaining customer care service for a device. Third party SP 612 may relate to a manufacturer of components of the device, suitable for providing additional information relating to the device. In one embodiment, SP 610 may obtain contextual information from several VoIP clients, which may have been prepackaged in connection with the initiation signal for a communication channel. As will be described in greater detail below, it is contemplated that structured hierarchies are utilized to carry contextual information (contextual data packets) between several VoIP entities in this illustrative embodiment. SP 610 processes the initiation signal and/or the client's contextual information to identify what information will be further collected and which appropriate source will be contacted, or queried, to obtain the identified information. However, the initial contextual information obtained from the VoIP Client 606 may be sufficient enough for SP 610 to provide services, for example routing a call initiation signal to a routed destination.

If the appropriate source is a third party SP 612, SP 610 requests the identified information and obtains the information from the third party SP 612. SP Server 610 and the third party SP 612 may exchange more information, including the client's contextual information relating to the VoIP Client 606 and/or the device. In an illustrative embodiment, upon receipt of the initiation signal, SP 610 obtains (or collects) any readily available contextual information, for example previously obtained contextual information related to VoIP Client 606 and/or the device, previous communications, service history and the like, from its database. Upon collecting relevant contextual information, SP 610 may push the relevant information into an agent module (e.g., aggregator agent 614) which may be capable of running in the background, aggregating the contextual information upon receipt of the contextual information, and analyzing the aggregated contextual information. As will be discussed in greater detail below, there are many ways to analyze the collected information. For example, the aggregator agent 614 may monitor whether the aggregation of certain information exceeds its corresponding threshold. Upon detecting that the aggregation exceeds the threshold within a predetermined period, the aggregator agent 614 may generate a set of events for SP 610.

Referring to FIG. 7B, SP 610 obtains the set of events from the aggregator agent 614. In one embodiment, SP 610 may execute appropriate actions on the set of events. One of the appropriate actions may be notifying a group of clients 616 who may be affected by the recognized potential problems, the possible solutions, previously provided solutions, etc. Some of the group of clients may not have initiated call connections, or may not have an existing communication channel with the call center. In such a case, SP 610 may utilize emergency broadcasting messages to alert some of the group of clients which are not currently engaging in conversations over communication channels. Another appropriate action may be contacting other service providers, or a third party service provider to resolve the recognized potential problems. In this example, SP 610 may forward information related to the potential problems, such as multiple sets of contextual information, log information generated by the aggregator agent 614, and other appropriate information to other service providers, or third party SP 612. Other appropriate actions may be collecting and processing detailed information (e.g., service provider information such as past calls, history, past solution, common problems, etc.) to provide a solution or verify the recognized problems. In one embodiment, SP 610 may further identify and obtain (or collect) additional contextual information relating to each communication channel with clients and update the current contextual information (e.g., previously obtained contextual information) accordingly.

In an illustrative embodiment, contextual information may continue to be collected utilizing a Server-Pull method (client provides information upon server's request), a Server-Push method (server pushes information without client's request), or the like. For example, SP 610 may transmit provider contextual information (e.g., contextual information relating to SP 610 including information corresponding to a set of applications) to a client (e.g., VoIP Client 606, VoIP Client 608) without having any request for such information from the client. The provider contextual information may correspond to embedded instructions for invoking a set of applications for collecting contextual information from a device, an individual user operating the device, the client, etc. In this manner, more contextual information can be collected. In one embodiment, the client may determine whether a set of applications relating to SP 610 is locally available. If the set of applications is not available, the client may request the set of applications which will be used for collecting and transmitting relevant contextual information to SP 610. The set of applications can be obtained from SP 610, other VoIP clients, a third party SP 612, a central database server, or the like.

Based on the newly obtained information, SP 610 may determine whether more information needs to be obtained. SP 610 may identify another set of applications for collecting more information. For example, SP 610 may identify an additional set of applications relating to user interfaces which is adaptive to the user interactions and/or other contextual information obtained from third party SP 612, and the like. SP 610 may transmit another set of applications (in the form of provider contextual information) or instructions to invoke such applications on the device. Alternatively, SP 610 may transmit source information where another set of applications can be obtained. Subsequently, the additional user interfaces may be provided to the client. SP 610 generates integrated contextual information by combing obtained contextual information, additional information, etc., before transmitting the contextual information. As mentioned above, SP 610 may identify part of the current contextual information to be removed, added, and/or modified before transmitting the contextual information and then update the received contextual information accordingly.

SP 610 determines a routed destination based on the contextual information, the additional information, the detailed information, and the like. The routed destination may be an operator, an agent, a primary contact, an interactive voice response system (IVRS), a call distributing system, a third-party service provider, and the like. Upon determining the routed destination, SP 610 may generate tailored contextual information based on a need of the determined destination. In this embodiment, SP 610 may route the initiation signal and the tailored contextual information to the determined destination. For example, customer service personnel at a call center can receive appropriate information relating to the requested services such as client information, previous history of services, possible solutions, next level of support and the like. Alternatively, SP 610 transmits the collected contextual information to another service provider which will eventually determine an appropriate destination party who can provide the desired service or a receiving party for the call initiation request. Another service provider of the client may forward the received contextual information to an appropriate destination party (a routed destination), which may collect more contextual information, if necessary, and update the received contextual information by adding, deleting, and/or modifying information.

In one embodiment, the structured hierarchies may be defined by Extensible Markup Language (XML). However, it is to be appreciated that the structured hierarchies can be defined by any language suitable for implementing and maintaining extensible structured hierarchies. Generally described, XML is well known as a cross-platform, software and hardware independent tool for transmitting information. Further, XML maintains its data as a hierarchically structured tree of nodes, each node comprising a tag that may contain descriptive attributes. XML is also well known for its ability to allow extendable (i.e. vendor customizable) patterns that may be dictated by the underlying data being described without losing interoperability. Typically, an XML namespace URI is provided to uniquely identify a namespace. In some instances, the namespace may be used as a pointer to a centralized location containing default information (e.g. XML Schema) about the document type the XML is describing.

In accordance with an illustrative embodiment, while the communication channel is being established, the client may identify a XML namespace for contextual information. When multiple contexts are aggregated, appropriate XML namespaces can be declared as an attribute at the corresponding tags. It is to be understood that XML namespaces, attributes, classes illustrated herein are provided merely as an example of structured hierarchies used in conjunction with various embodiments of the present invention. After the routed destination and SP 610 receive the XML namespace information, the client transmits a set of contextual data packets, defined in accordance with the identified XML namespace, to the routed destination. When a namespace is present at a tag, its child elements share the same namespace in pursuant to the XML scope rule defined by XML 1.0 specification. As such, the routed destination and the client can transmit contextual information without including prefixes in all the child elements, thereby reducing the amount of data packets transmitted for the contextual information.

Figure 8A:
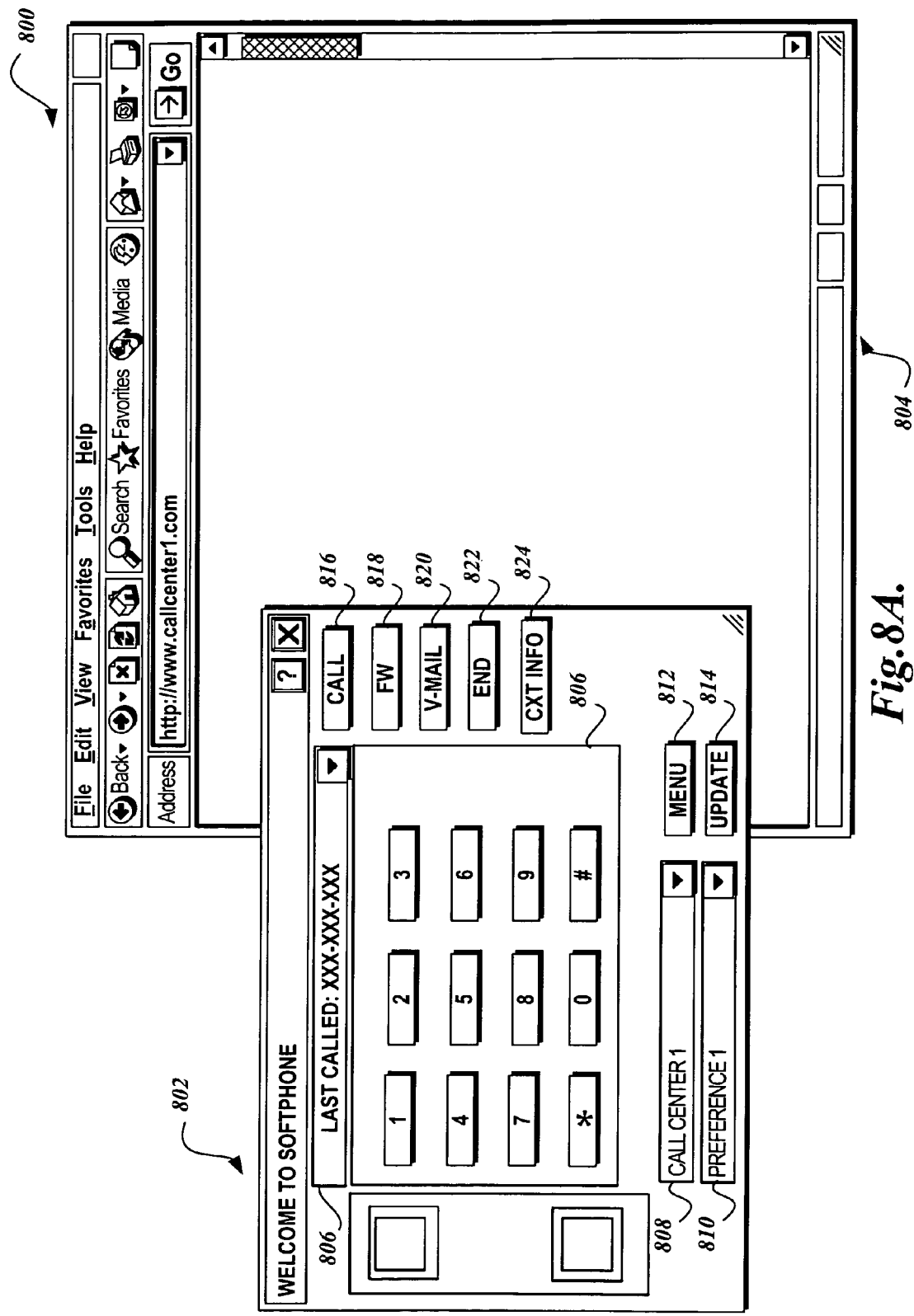
FIGS. 8A-8C are block diagrams illustrating exemplary user interfaces in accordance with an aspect of the present invention.
Figure 8B:
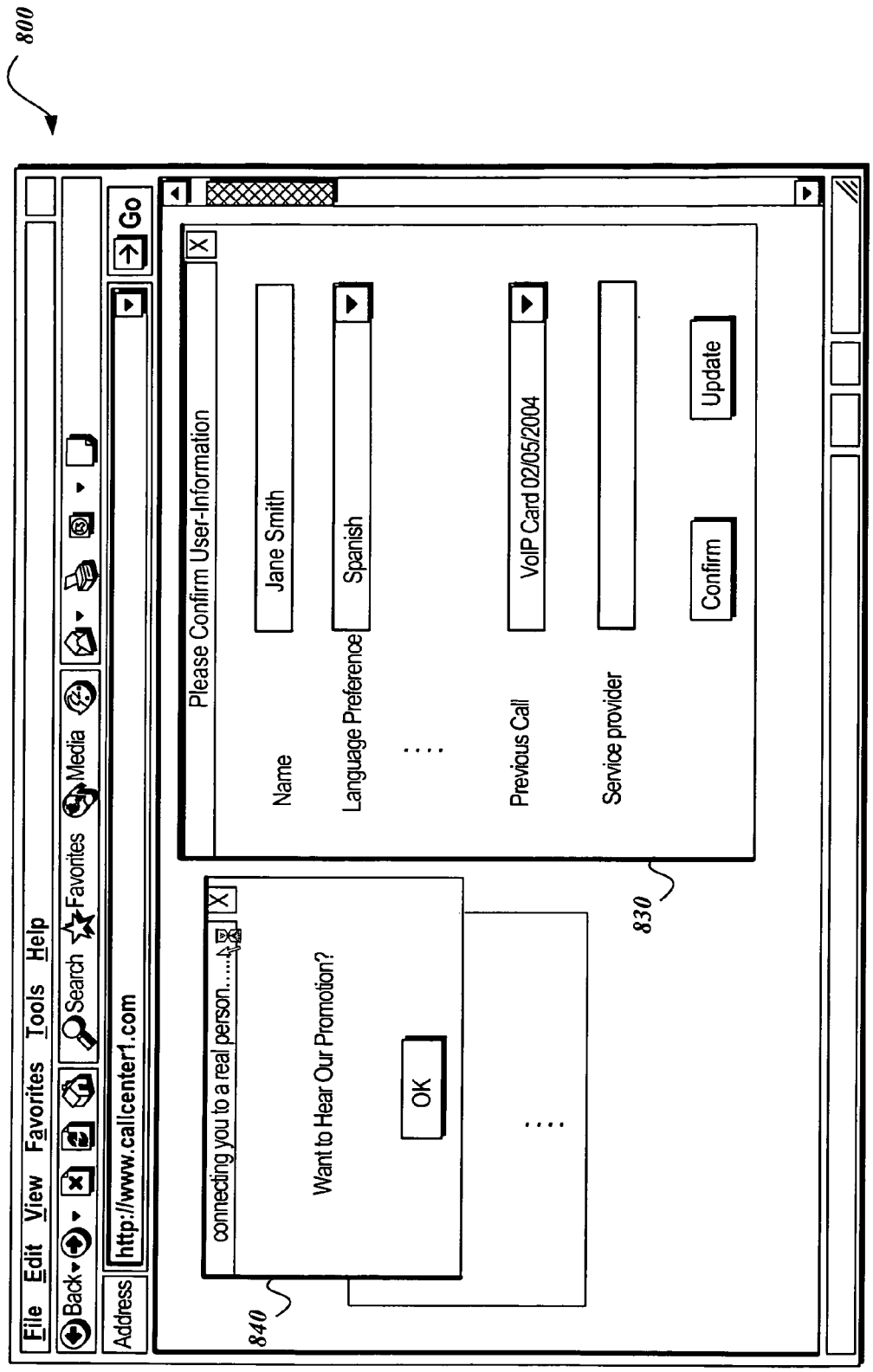
Figure 8C:
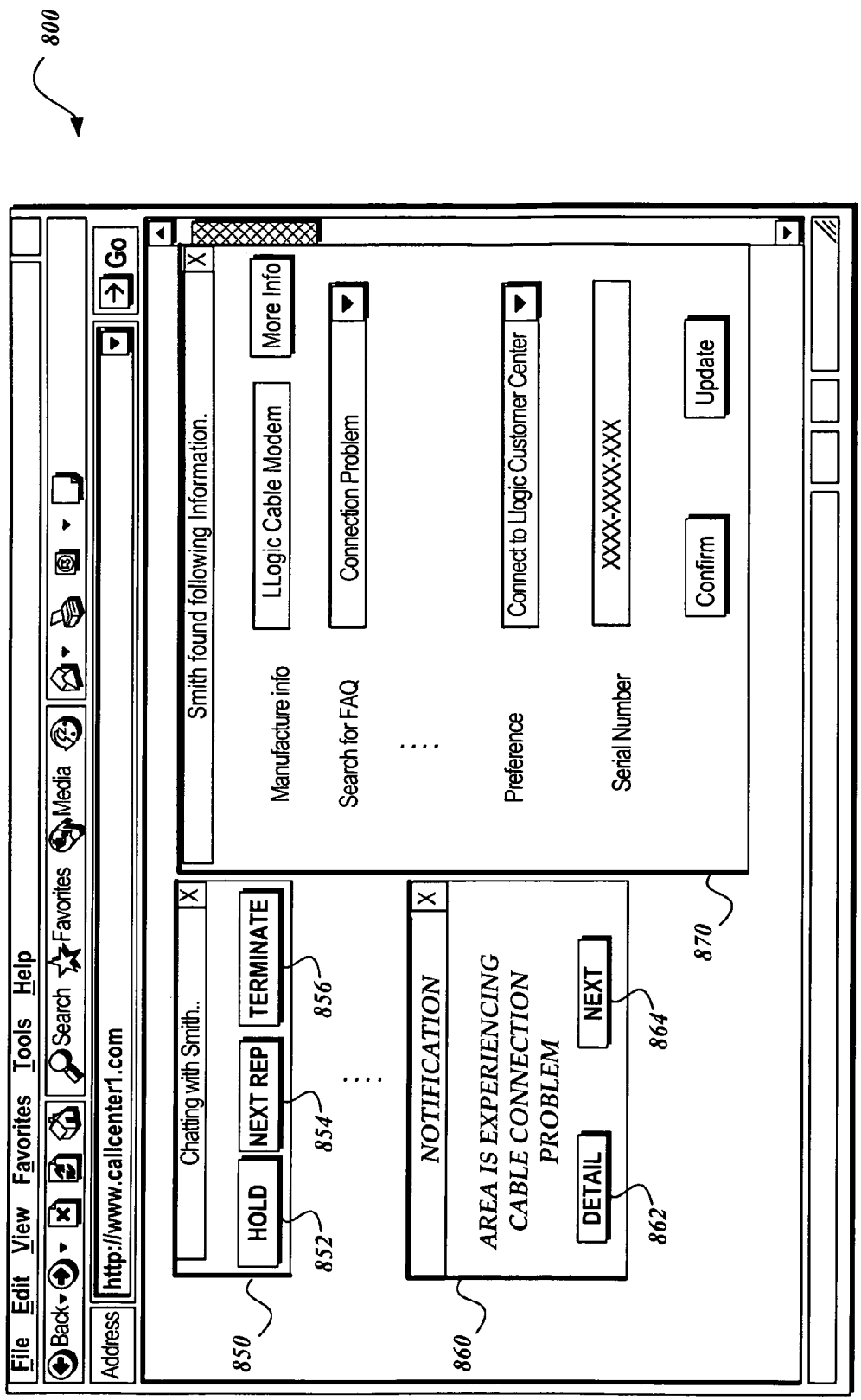

FIGS. 8A-8C are block diagrams illustrating user interfaces 800 in accordance with an exemplary embodiment of the present invention. For discussion purposes, assume that a client sends a signal to initiate a call to a call center, for reporting problems in a device, utilizing a VoIP device (e.g., computer, etc.) suitable for exchanging VoIP conversations. With reference to FIG. 8A, a block diagram illustrates user interfaces 800 initially displayed on a screen of the VoIP device when a client initiates a call connection by sending an initiation signal. In a particular embodiment, an individual user or a client may have launched an Internet Phone User Interface 802 in order to send a signal to initiate a call. It is contemplated that appropriate software and application components relating to VoIP conversations are readily resident on the VoIP device.

In an illustrative embodiment, the Internet Phone User Interface 802 may include various buttons and sub-screens to assist a user in making a VoIP call connection. For example, the Internet Phone User Interface 802 may include a keypad 804 similar to a keypad of a conventional telephony device. The Internet Phone User Interface 802 may include several selection menus 806, 808, 810 allowing the user to select the last call number, a number from an address book (e.g., CALL CENTER 1), desired user preferences, and the like. MENU 812 and UPDATE 814 buttons may be utilized to change and/or view the selection menus 806, 808, 810.

In one embodiment, other functional buttons 816, 818, 820, 824 may provide shortcuts for frequently used VoIP call features. For example, when CXT INFO 824 button is selected, a set of contextual information (e.g., prepackaged contextual information, information collected by the VoIP device, etc.) may be transmitted without receiving any requests for such contextual information. Additionally, in an illustrative embodiment, a main user interface 804 relating to the service provider may be provided, which may be a known Web page of the service provider, a previously obtained user interface (relating to past services), applications pushed by the service provider upon receipt of the request, or the like. In this embodiment, during a connection set-up phase, the service provider may receive a request for a service (e.g., a call connection request to the 800 number of a particular call center) from a client and subsequently receive the client's contextual information. Based on the request and the client's contextual information, the service provider may determine whether additional information needs to be obtained from the client. In one embodiment, when the client does not wish to send any contextual information or does not have capabilities to collect or transmit contextual information, no contextual information associated with the communication channel will be received. In this embodiment, the service provider may have a predefined default destination for the calls for which the service provider cannot determine appropriate destination. Alternatively, the service provider may collect and/or obtain the contextual information relating to the client from proper sources such as its local storage, other service providers, other clients, third party service providers, etc.

Referring to FIG. 8B, during the connection set-up phase, more information can be collected via user interactions on several user interfaces 830, 840. As mentioned above, the service provider's contextual information relating to the set of applications may be provided to the client. Alternatively, a device of the client may already have previously obtained applications relating to the user interfaces suitable for providing desired user interactions. In this manner, the appropriate user information (client's contextual information) collected before the initiation signal is routed to a routed destination. It is contemplated that the exchange of contextual information can be done any time during a conversation. In one embodiment, in order to improve network bandwidth, a prolonged period of silence (no exchange of voice data packets for a threshold time) may be detected and utilized for exchange of contextual information.

Referring to FIG. 8C, during a conversation, the call center can collect more information from the client. While the client communicates with one of the contacts of the call center, media information, and contextual information may be exchanged via various user interfaces. In one embodiment, several sub-screens may be populated, including a sub-screen 850 for the communication channel, a sub-screen 860 for notification of the problem recognized from information relating to multiple clients, a sub-screen 870 for collecting more contextual information, and the like. For example, the sub-screen 850 for the communication channel may display who is communicating and provide selection buttons 852, 854 which the individual user can choose in order to control the communication channel connection. For example, the user can select HOLD 852 button to hold, interrupt or mute the conversation. NEXT REP 854 button may allow the user to alter the communication channel connection by selecting next available destination. The user can select TERMINATE 856 button to terminate the communication channel connection. The sub-screen 860 may be utilized to alert or notify identified problems to clients. For example, a cable connection problem identified in a specific area may be notified to the clients who reside in such area. The user can further select DETAIL 862 button to obtain detailed information relating to the problem or NEXT 864 button to check other problems or issues.

With reference to FIGS. 9A-9F, block diagrams illustrative of various classes and attributes of structured hierarchies corresponding to VoIP contextual information are shown. The VoIP contextual information exchanged between various VoIP entities (e.g., clients, service providers, etc.) may correspond to a VoIP namespace 900. In one embodiment, the VoIP namespace 900 is represented as a hierarchically structured tree of nodes, each node corresponding to a subclass which corresponds to a subset of VoIP contextual information. For example, a VoIP Namespace 900 may be defined as a hierarchically structured tree comprising a Call Basics Class 902, a Call Contexts Class 910, a Device Type Class 920, a VoIP Client Class 930, and the like.

Figure 9A:
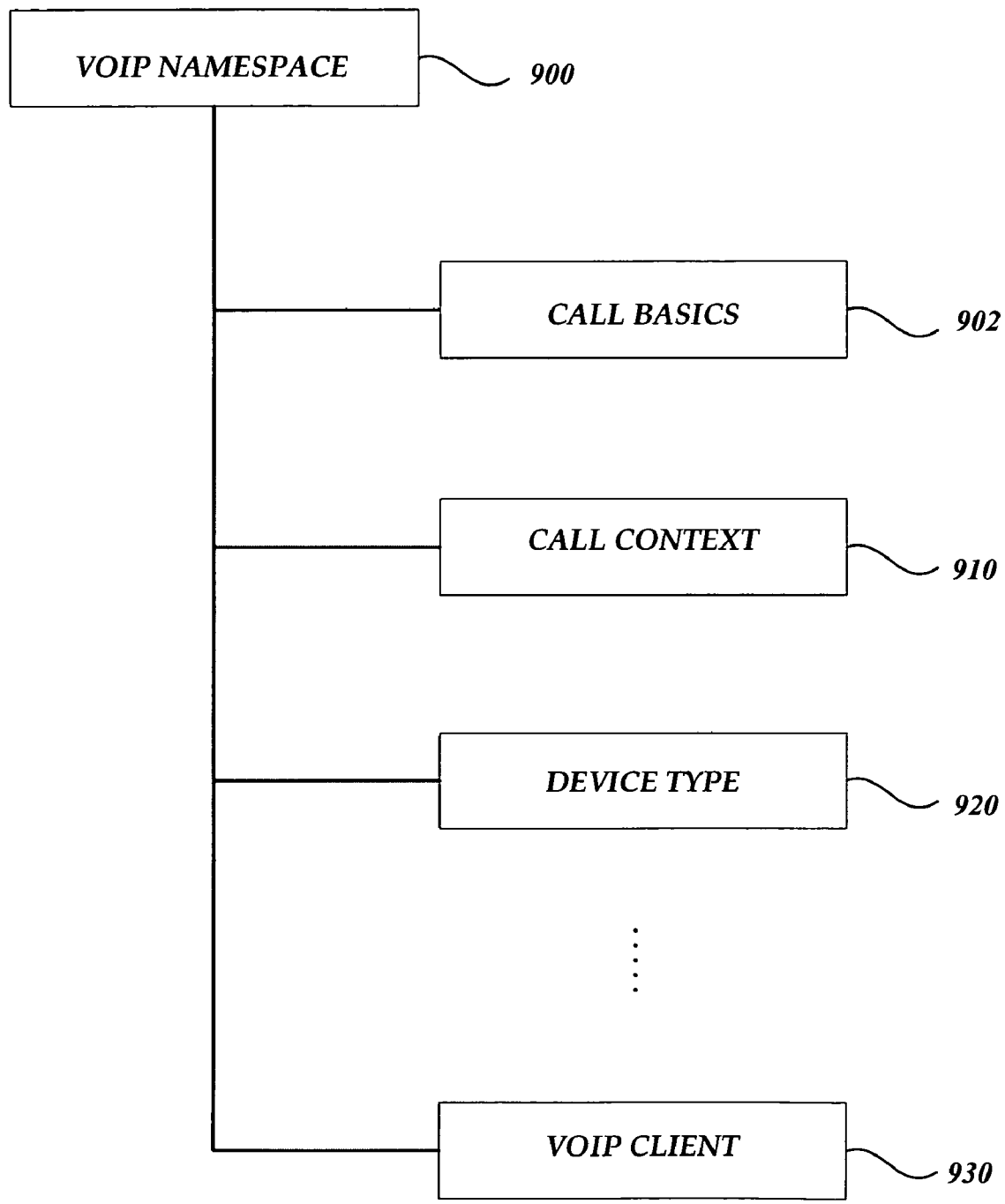
FIG. 9A is a block diagram illustrative of various attributes and classes of structural hierarchies corresponding to VoIP contextual information in accordance with an aspect of the present invention.
Figure 9B:
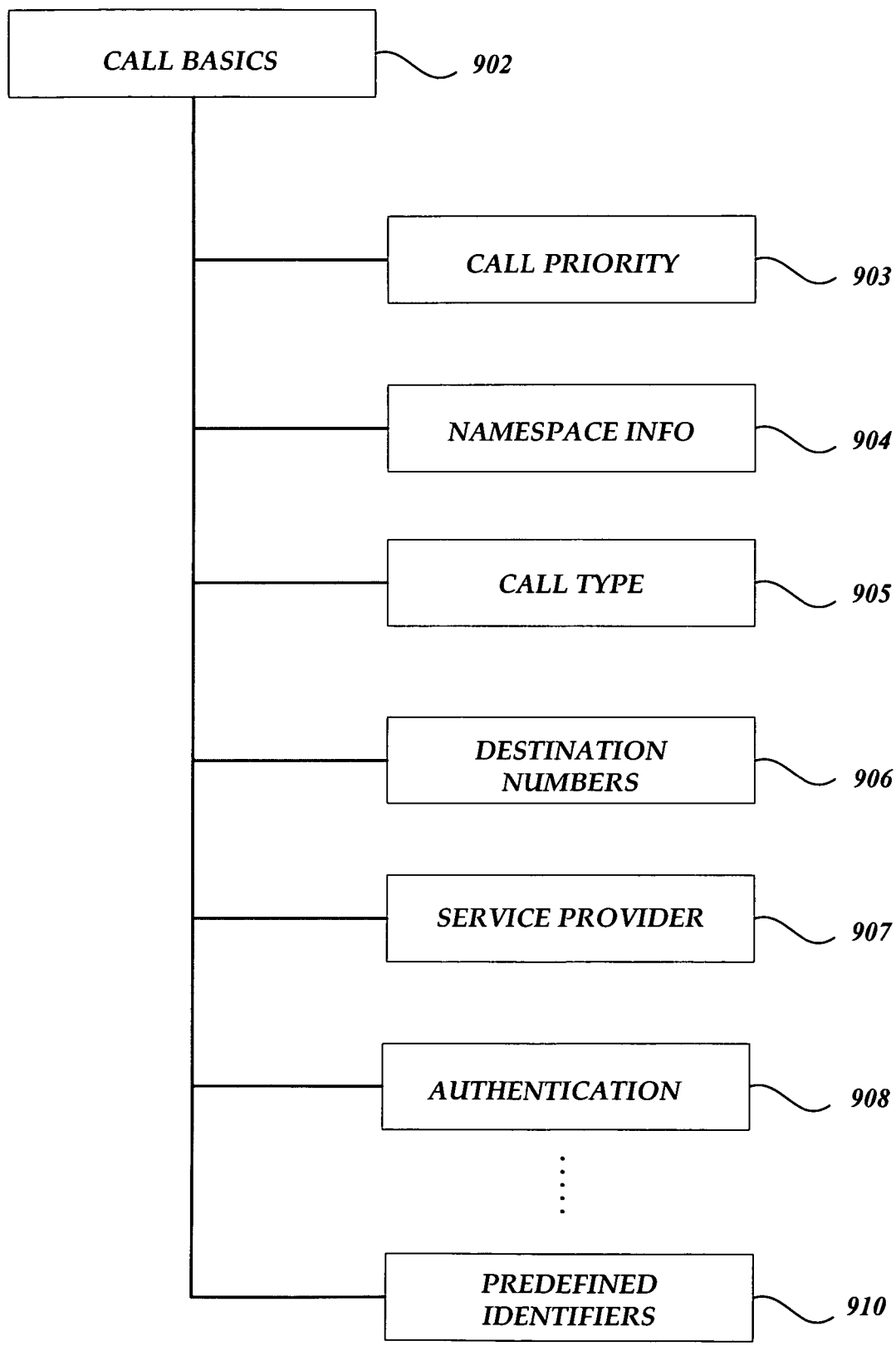
FIG. 9B is a block diagram illustrative of a call basic class which is an exemplary subset of the structural hierarchies illustrated in FIG. 9A.

With reference to FIG. 9B, a block diagram of a Call Basics Class 902 is shown. In an illustrative embodiment, Call Basics Class 902 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's client ID number), destination numbers (e.g., callees' client ID numbers or telephone numbers), call connection time, VoIP service provider related information, and/or ISP related information such as IP address, MAC address, namespace information, and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, and so forth. In one embodiment, the contextual information relating to a conversation channel connection may include predefined identifiers which represent emotions, sounds (e.g., "ah", "oops", "wow", etc.) and facial expressions in graphical symbols. In one embodiment, a Call Basics Class 902 may be defined as a sub-tree structure of a VoIP Namespace 900, which includes nodes such as call priority 903, namespace information 904, call type 905, destination numbers 906, service provider 907, predefined identifiers 908, and the like.

Figure 9C:
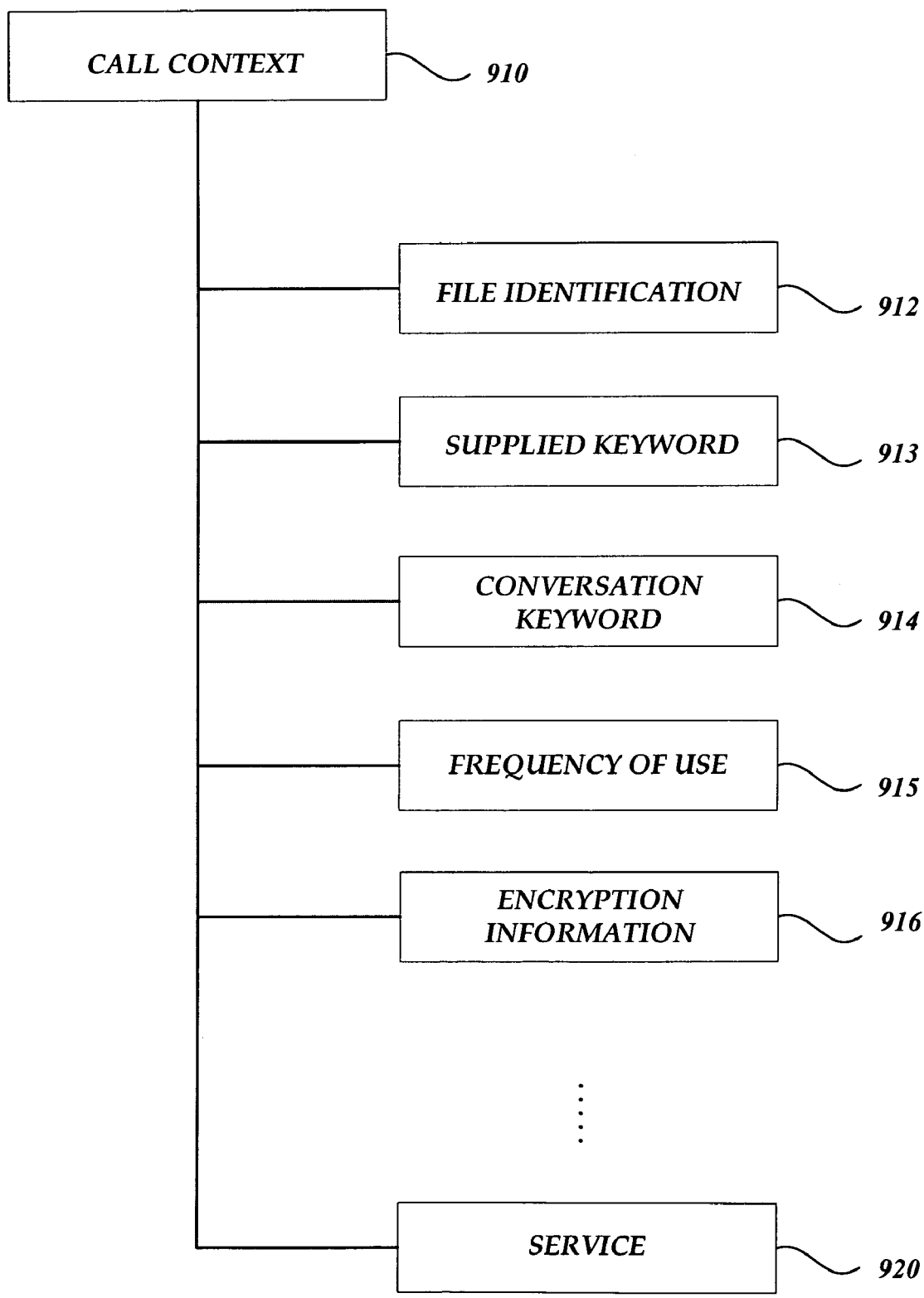
FIG. 9C is a block diagram illustrative of a call context class which is an exemplary subset of the structural hierarchies illustrated in FIG. 9A.
Figure 9D:
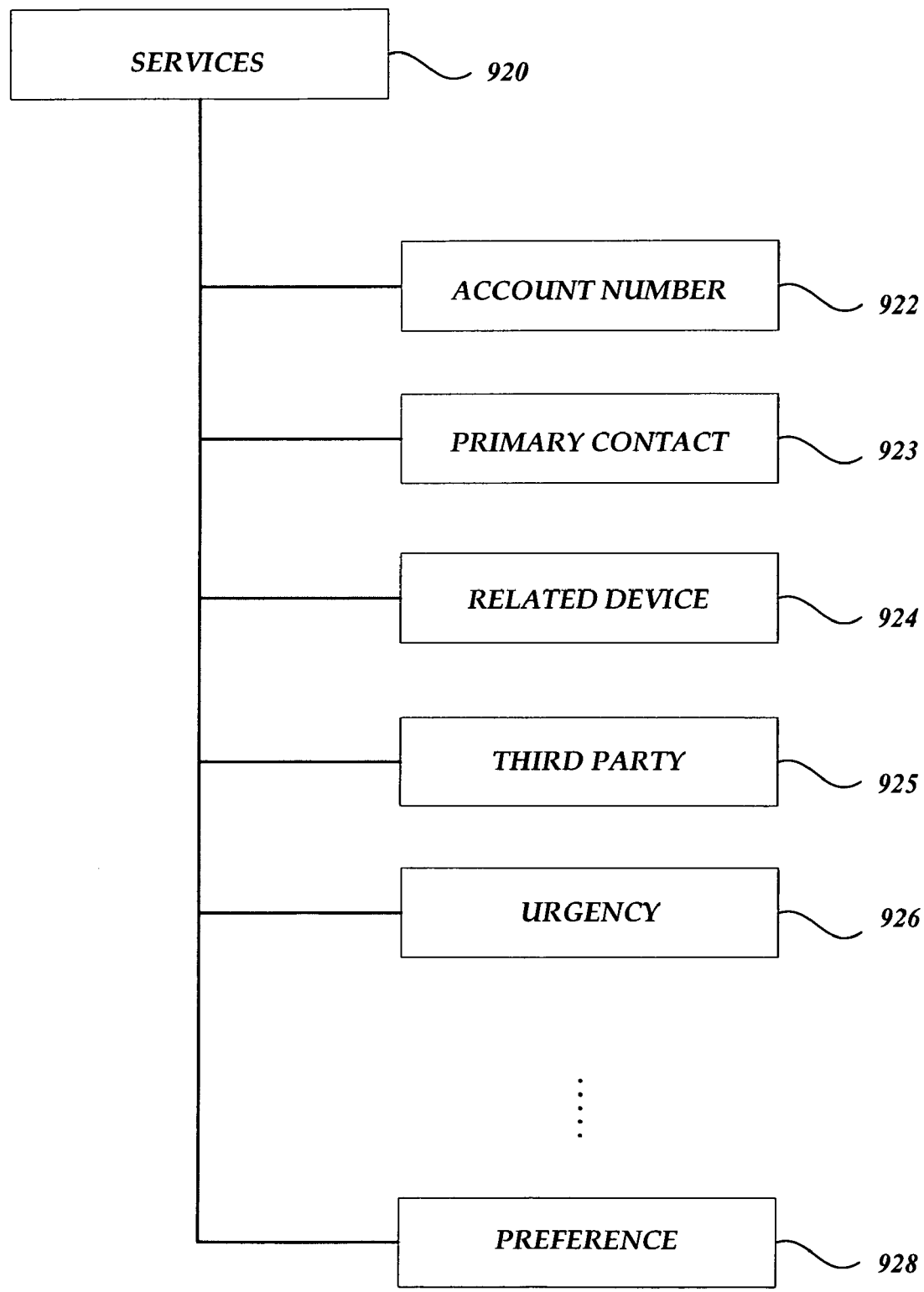
FIG. 9D is a block diagram illustrative of a Service subclass which is an exemplary subset of the structural hierarchies illustrated in FIG. 9C.

With reference to FIGS. 9C and 9D, block diagrams of a Call Contexts Class 910 and one subclass of the Call Contexts Class 910 are shown. In one embodiment, a subset of VoIP contextual information relating to conversation context may correspond to the Call Contexts Class 910. The contextual information relating to conversation context may include information such as keywords supplied from a client, a service provider, or a network, identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation). Additionally, the contextual information relating to conversation context may include information relating to encryption (e.g., whether and/or how to encrypt contextual information, the type of encryption such as asymmetric/symmetric or bit strength, etc.) and subject of service (a type or nature of the service when a client requests such service from a service provider), among many others. In accordance with an illustrative embodiment, a Call Contexts Class 910 may be defined as a sub-tree structure of a VoIP Namespace 900, which includes nodes corresponding to file identification 912, supplied keyword 913, conversation keyword 814, frequency of use 915, encryption information 916, service 920, and the like.

Referring to FIG. 9D, a block diagram of a Service 920 subclass is shown. In one embodiment, the Service 920 subclass may correspond to a subset of information relating to a requested service. The contextual information relating to a requested service may include a client account number associated with the requested service. The client account number may be used as a key to search the database associated with the service provider. The database may be maintained by a third party server. In one embodiment, in a call center environment, a primary contact may be assigned to each client. For example, general clients may have a help desk operator as a default primary contact while an important client (e.g., vendors, high volume clients, etc.) may have a dedicated primary contact. Alternatively, an IVRS may be assigned as a default primary contact. Likewise, the last primary contact that has previously provided good service may be recorded as a primary contact.

The contextual information relating to a requested service may further include information relating to a device which requires the service (this may be the same as, or different from, a device currently used by the client in a communication channel). Third party SPs may be associated with a manufacturer of the device, or manufacturer of components of the device. Such third party SPs may have additional information crucial to providing the requested services. Further, the contextual information relating to a requested service may include a level of urgency which may be utilized, in conjunction with other information, to determine a priority of the requested service. The client may specify preferences or rules related to the requested services. For example, the client may specify a language preference, a time threshold that the client is willing to wait for the service, and the like. In accordance with an illustrative embodiment, a Service Subclass 920 may be defined as a sub-tree structure of a Call Contexts Class 910, which includes nodes corresponding to account number 922, primary contact 923, related devices 924, third party 925, urgency 926, preference 928, and the like.

Figure 9E:
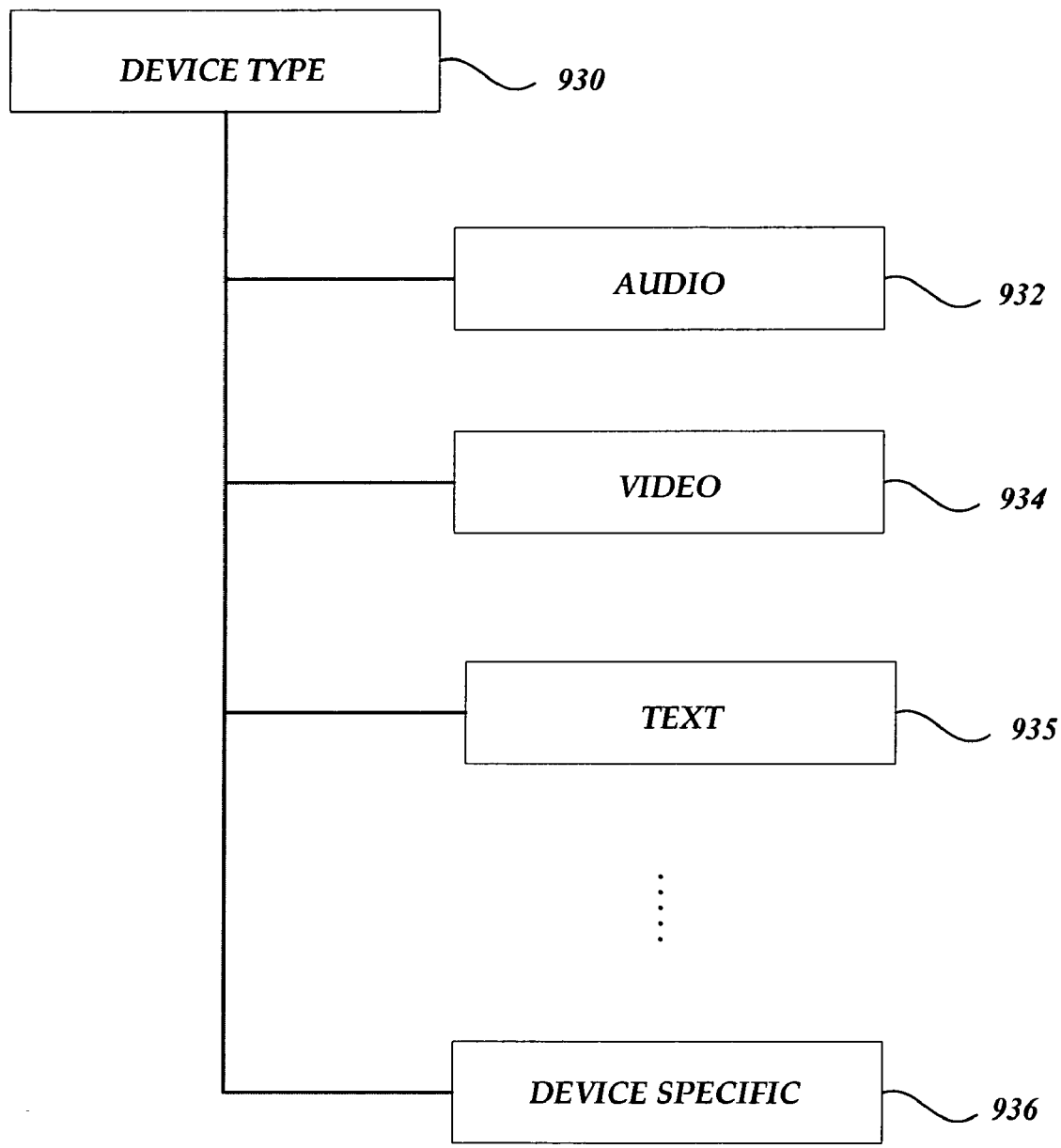
FIG. 9E is a block diagram illustrative of a device type class which is an exemplary subset of the structural hierarchies illustrated in FIG. 9A.

With reference to FIG. 9E, a block diagram of a Device Type Class 930 is depicted. In one embodiment, a Device Type Class 930 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, Digital Signal Processing (DSP) card information, and the like. The subset of the VoIP contextual information relating to the VoIP client device may include video related information which may be needed to process video data generated by the VoIP client device. The video related information may include resolution, refresh, type and size of the video data, graphic card information, and the like. The contextual information relating to VoIP client devices may further include other device specific information such as type of the computer system, processor information, network bandwidth, wireless/wired connection, portability of the computer system, processing settings of the computer system, and the like. In an illustrative embodiment, a Device Type Class 930 may be defined as a sub-tree structure of a VoIP Namespace 800, which includes nodes corresponding to Audio 932, Video 934, Text 935, Device Specific 936, and the like.

Figure 9F:
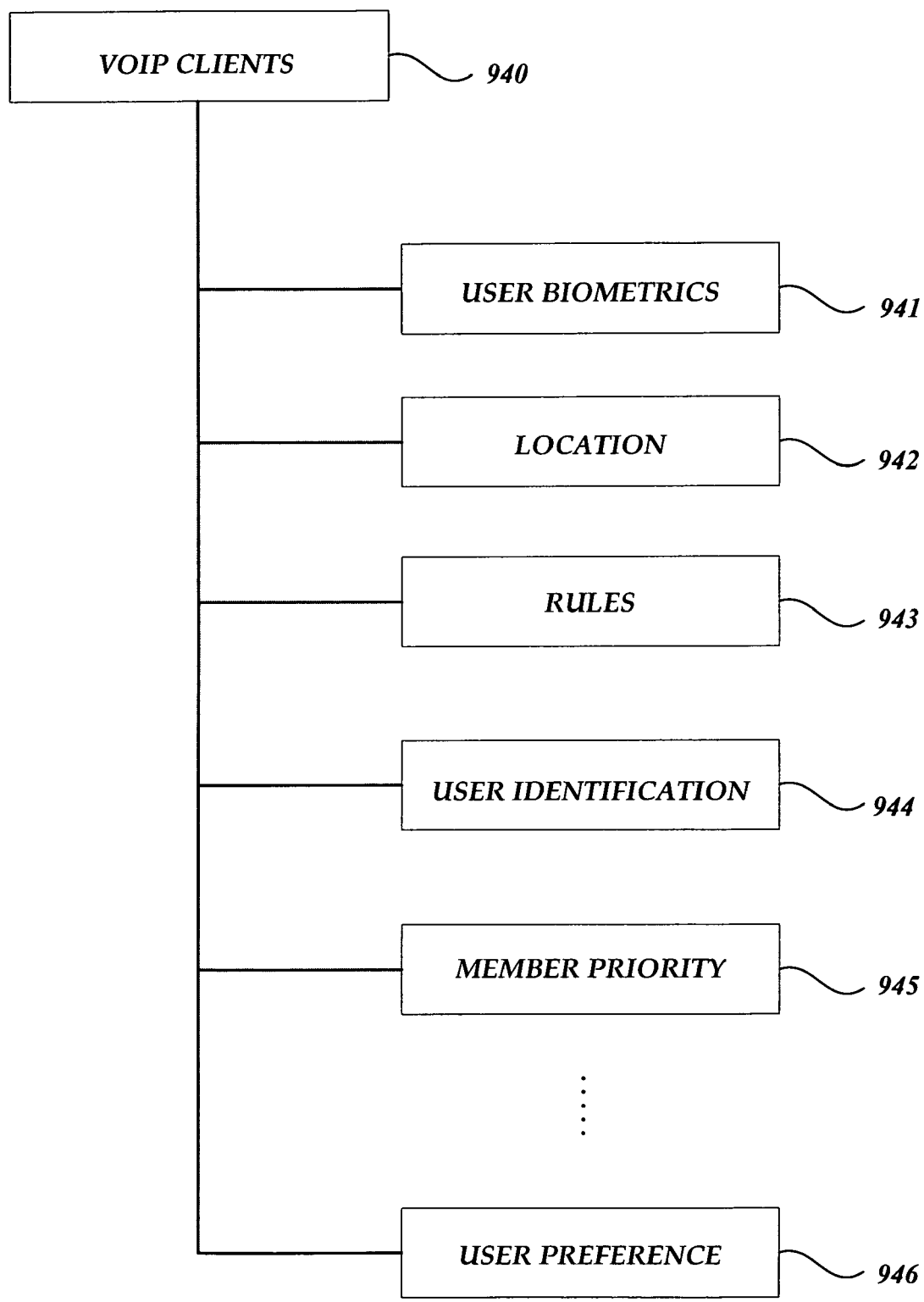
FIG. 9F is a block diagram illustrative of a VoIP clients class which is an exemplary subset of the structural hierarchies illustrated in FIG. 9A.

FIG. 9F depicts a block diagram of a VoIP Client Class 940. In accordance with an illustrative embodiment, a VoIP Client Class 940 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. The subset of the VoIP contextual information relating to the VoIP client may include assigned phone number, user contact information (such as name, address, company, and the like), rules defined by the client, user preferences, digital rights management (DRM), a member rank of an individual user in an organization, priority associated with the member rank, and the like. The priority associated with the member rank may be used to assign priority to the client for a conference call. As will be described in greater detail below, the subset of the VoIP contextual information relating to the VoIP client may include location information. In one embodiment, a VoIP Client Class 940 may be defined as a sub-tree structure of a VoIP Namespace 900, which includes nodes corresponding to user biometrics 941, user preference 942, rules 943, user identification 944, member priority 945, location 946, and the like.

Figure 10:
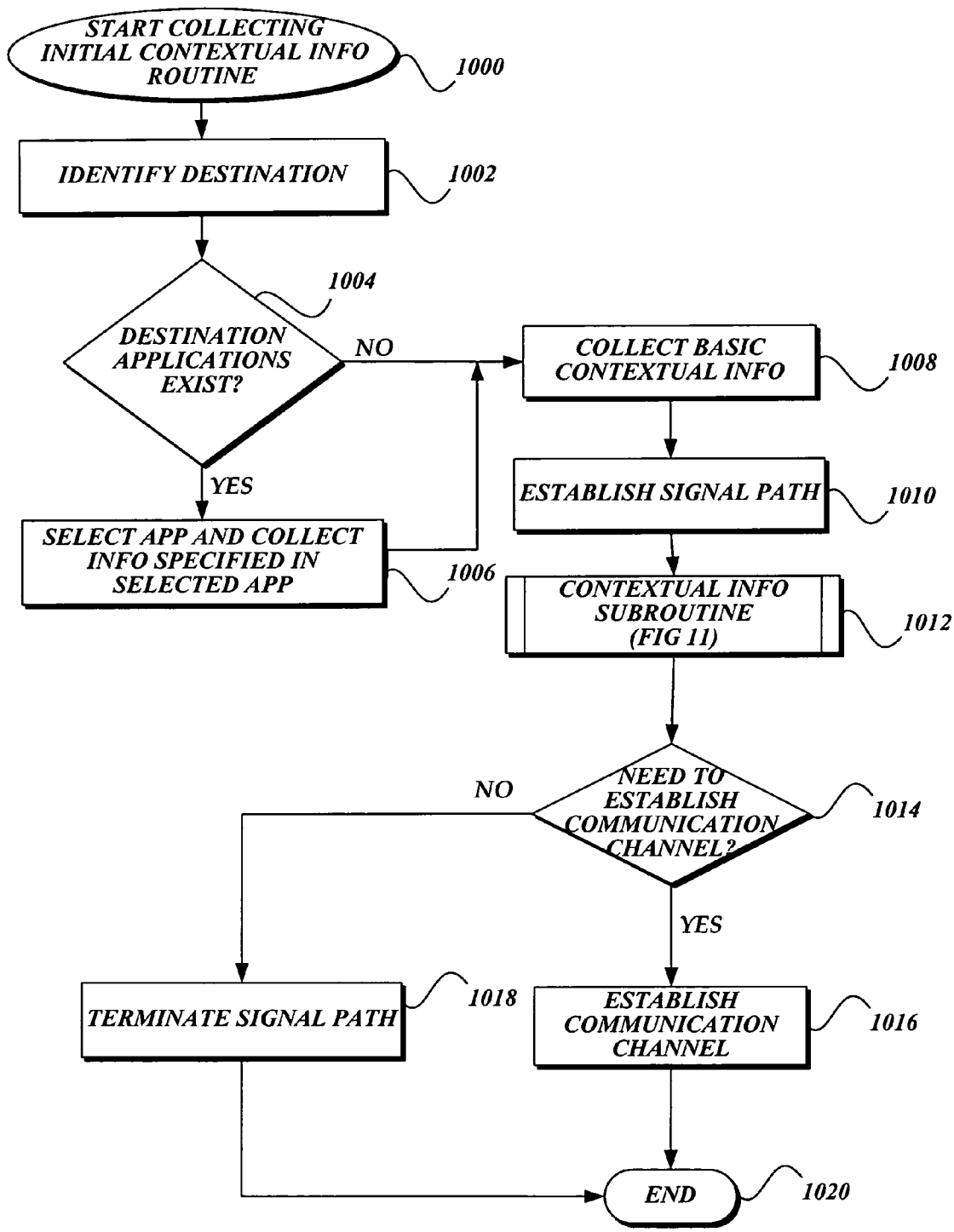
FIG. 10 is a flow diagram illustrating a routine for collecting initial contextual information in accordance with an aspect of the present invention.

FIG. 10 is a flow diagram illustrating a routine 1000 for collecting and/or obtaining initial contextual information relating to a communication channel in accordance with an embodiment of the present invention. For the purpose of discussion, assume that a device of a calling VoIP client (calling client) may be associated with several service providers for receiving services. In addition, appropriate software and application components relating to VoIP conversations are readily resident on the device. The calling client may be capable of identifying the destination service provider based on previously obtained information, for example a service contract, a warrantee, or the like. Further, the destination service provider may be determined based on a desired service, a detected problem, etc. The calling client transmits a service request to the destination service provider by transmitting a signal to initiate a call with one of the contacts (e.g., an operator, an agent, an IVRS, etc.) representing the destination service provider.

Although the illustrative embodiment is described in connection with the routine 1000 and focused on collecting contextual information by the device of the calling client during a connection set-up phase, it is contemplated that contextual information can be collected and/or obtained by a service provider, or a third party service provider, at any time (including before, during, or after terminating a communication channel). It is also contemplated that any suitable VoIP entities can be a source where the calling client can obtain contextual information.

Beginning at block 1002, the calling client may identify a destination service provider (e.g., a call center, a service provider, etc.) for requesting services based on previously obtained information stored in local storage. Alternatively, the destination service provider related information may be obtained from a management server with a central database which maintains device related information such as a device serial number, a firmware version, purchase information, a call center phone number, a web address of the call center, or the like. Based on various types of information, the destination service provider for requesting services may be determined.

In one embodiment, a device may be capable of initiating an automatic call to a designated destination service provider if the device is experiencing a certain problem corresponding to the designated destination. In this example, the destination service provider is predefined based on a potential problem on the device. At decision block 1004, a determination is made as to whether a set of applications relating to the identified destination is locally available. One example of the set of applications may be structured hierarchies. As described above, based on the content of the contextual information, at least one structured hierarchy may be identified from predefined structured hierarchies, such as an XML namespace, and the like.

In one embodiment, minimum predefined structured hierarchies can be agreed among VoIP entities. Subsequently, any additional structured hierarchies needed for the communication of contextual information will be exchanged among VoIP entities before the corresponding contextual information is transmitted. If it is determined at decision block 1004 that the set of applications is locally available, at block 1006, an appropriate application may be selected and a set of contextual information may be collected in accordance with the selected applications. If it is determined at decision block 1004 that the set of applications is not available, at block 1008, basic contextual information may be collected. In one embodiment, the calling client may send a query for the appropriate applications to a proper source including the call center, a third party service provider or the like. In another embodiment the calling client may receive applications via a dedicated device while no media information is exchanged. For example, the applications may be updated periodically. In another embodiment, the calling client may have old versions of applications. In this example, the calling client may send the version number of the applications to the destination service provider to confirm the compatibility of the two different versions of applications. In response to this, the destination service provider may send additional information to upgrade the applications resident in the device of the client.

Further, the destination service provider may send a confirmation of the compatibility or identify a source to get the updated application, or the like. At block 1010, a signal path between the calling client and the identified destination service provider is established. In one embodiment, the calling client may send a call-initiation signal to the identified destination service provider. Upon receipt of the call-initiation signal, the call center may send a response to the call-initiation signal. The response may be an acceptance of the call-initiation signal, a rejection of the call-initiation signal, etc. Over the signal path, the calling client and the identified destination service provider may exchange contextual information. For example, the call initiation signal may be related to a service request and its corresponding information is readily available on the destination service provider before the conversation begins between the calling client and the call center. The identified destination service provider may send the information corresponding to the service request, a request for additional information, a request for other relevant contextual information, or the like. The calling client may collect and provide requested contextual information. At block 1012, contextual information may be exchanged via a contextual information subroutine which will be discussed in greater detail below in FIG. 11. At decision block 1014, a determination is made as to whether a communication channel needs to be established between the calling client and the destination service provider. For example, if the query of the calling client (a service request, an inquiry for information, and the like) has been satisfied by exchanging contextual information, the communication channel does not need to be established. In one embodiment, a contact point (e.g., user, automated system, etc.) of the device may be asked whether the contact point has received adequate information or services which the call initiation intended to receive. For example, a user interface may be populated to get the calling client's answer as to whether the query is satisfied, the furtherance of a communication channel establishment is desired, or additional services are desired, and the like.

If it is determined at decision block 1014 that the communication channel needs to be established since all the queries (desired services, inquiries for information, etc.) of the calling client have not been satisfied, at block 1016 the communication channel will be established. If it is determined at decision block 1014 the communication channel does not need to be established since all the queries have been satisfied at block 1018, the signal path will be terminated. The routine 1000 completes at block 1020 after establishing a communication channel (block 1016) or terminating the signal path (block 1018).

It is to be understood that the embodiments explained in conjunction with the routine 1000 are provided merely for example purposes. In one embodiment, a VoIP device may send an automatic service request upon detection of problems without any human interaction. It is contemplated that the routine 1000 can also be performed by a service provider or a third party service provider. For example, a service provider can collect contextual information relating to a communication channel and request additional information from the calling client, devices of the calling client, or a third party service provider. It is further contemplated that a service provider can forward the call-initiation signal and contextual information to a third party service provider which is suitable to route the incoming signal (call-initiation signal) to the destination service provider.

Figure 11:
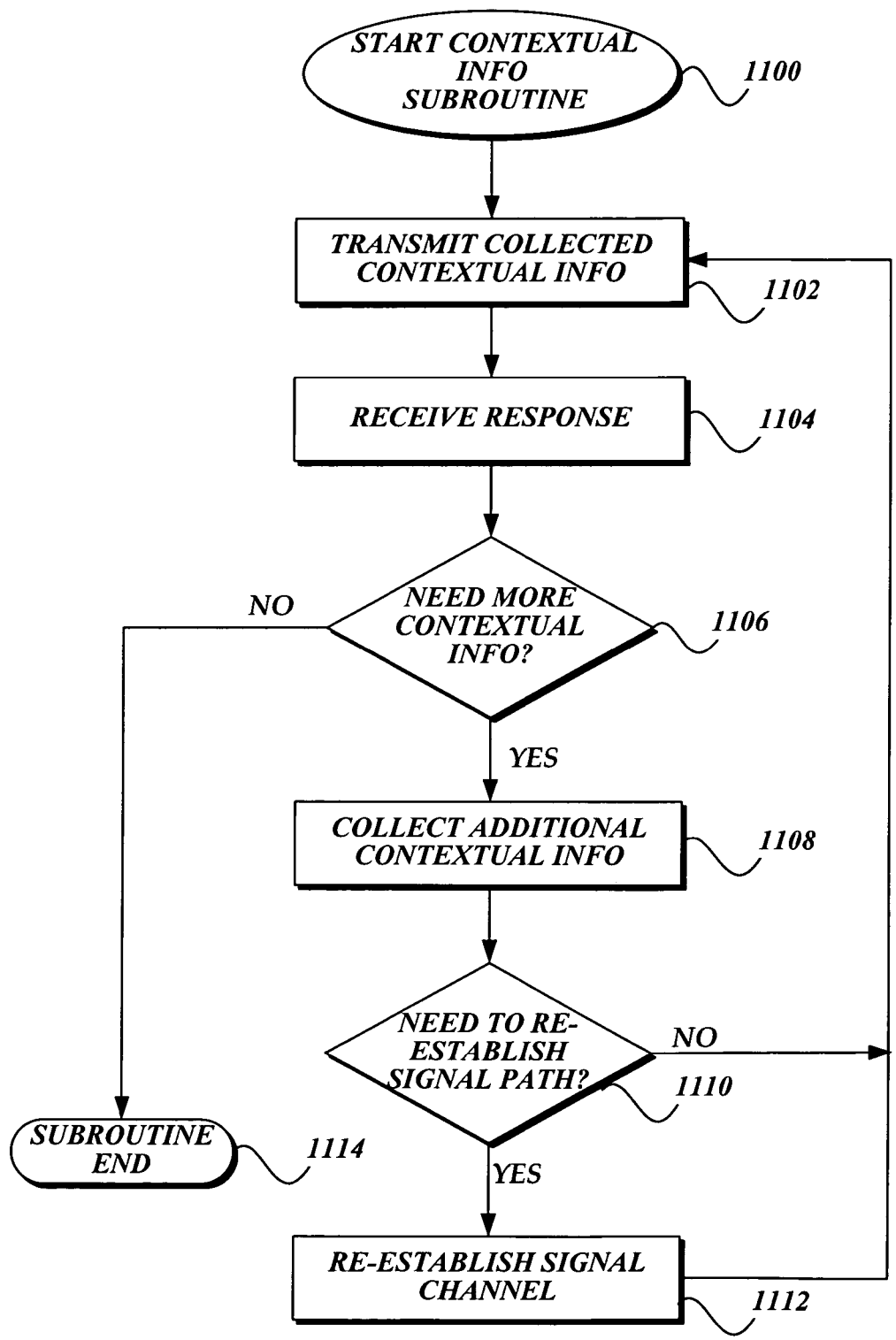
FIG. 11 is a flow diagram illustrating a contextual information subroutine suitable for use in the routine illustrated in FIG. 10.

FIG. 11 is a flow diagram of a subroutine 1100 for collecting and transmitting contextual information over a signal path in accordance with an embodiment of the present invention.

As with FIG. 10, the calling client may have a signal path established with a destination service provider and have collected basic contextual information. At block 1102, the collected contextual information may be transmitted to the destination service provider over a signal path. Upon receipt of the contextual information, the call center may send a response based on the contextual information. At block 1104, the response to the contextual information may be received. The response may be a request for additional information, a request for other relevant contextual information, or the like. Further, the response may be information related to providing the requested service. For example, a call initiation signal may be related to a service request and its corresponding information is readily available on the destination service provider before the conversation begins between the calling client and the destination service provider (e.g., a call center). Upon receipt of the contextual information, the destination service provider may collect detailed information, which can be a potential answer for a query associated with the call and then transmit the collected information. At decision block 1106, a determination is made as to whether additional information needs to be collected based on the response. If the additional contextual information needs to be collected, at block 1108, the additional contextual information may be collected.

In one embodiment, the calling client may identify additional contextual information which needs to be collected for the communication channel. An appropriate source for collecting additional contextual information may be determined. It is contemplated that any VoIP entities such as other clients, a third party service provider other service providers, and the like can be an appropriate source for the contextual information. If necessary, the calling client may contact the appropriate source and collect the additional contextual information. In one embodiment, the calling client may send an inquiry for obtaining the additional contextual information to the appropriate source (e.g., third party service provider). It is further contemplated that the calling client may utilize other suitable devices to collect the information if the device currently in use does not have the functionality to contact or collect such information. The information collected by other devices may be forwarded to the device which is currently in use.

At decision block 1110, a determination is made as to whether the signal path needs to be re-established. In one embodiment, a signal path may expire after a predetermined time period. If it is determined at decision block 1110 that the signal path needs to be established due to expiration, at block 1112, the signal path will be re-established between the calling client and the service provider. After re-establishing the signal path (block 1112) or if it is determined that the signal path does not need to be established (decision block 1110), the routine will repeat the above mentioned steps until no more contextual information need to be collected or transmitted. If it is determined at decision block 1106 that no more contextual information needs to be collected or transmitted, the subroutine terminates at block 1114.

Figure 12:
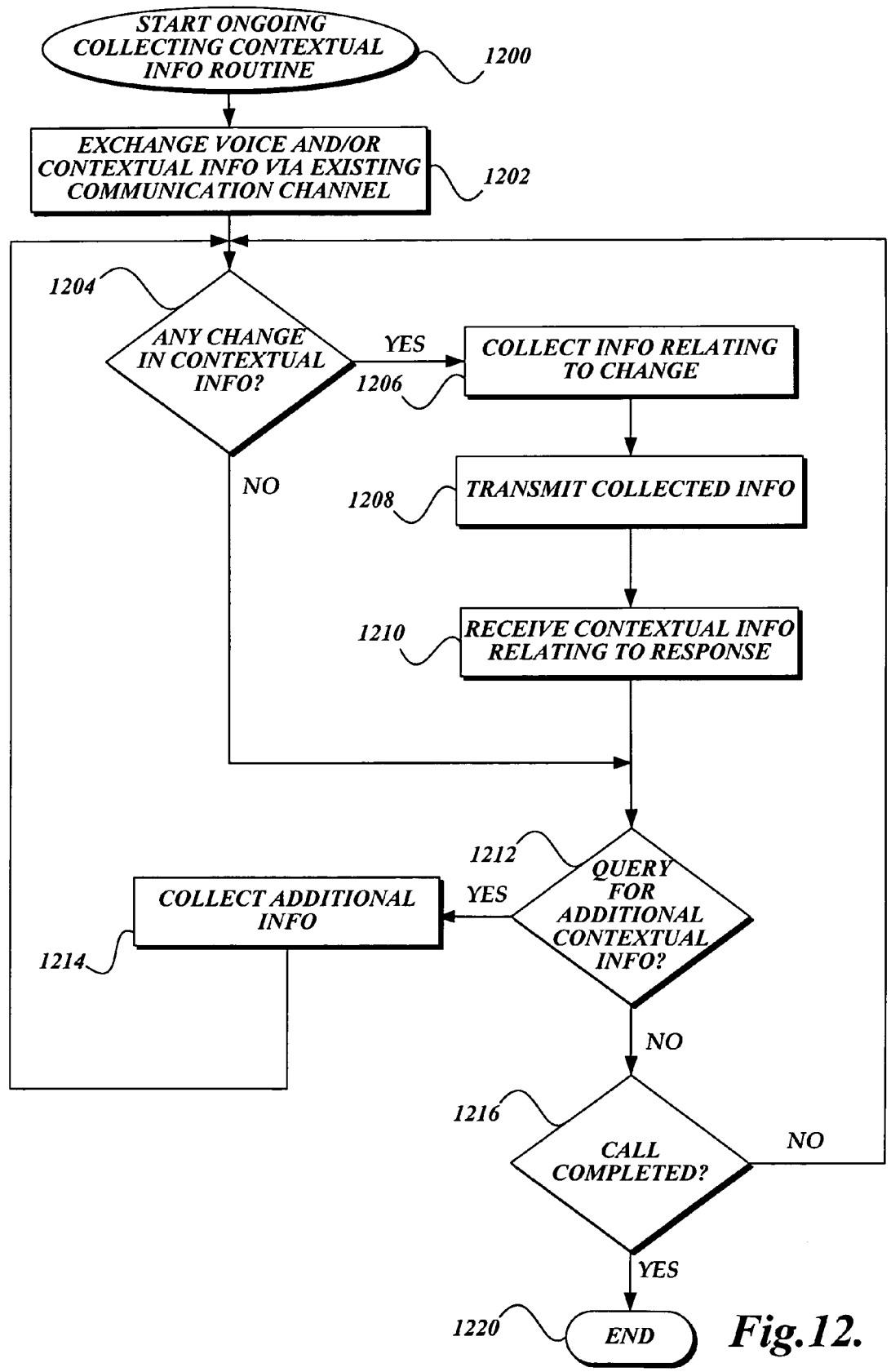
FIG. 12 is a flow diagram illustrating a routine for an ongoing collection of contextual information over an existing communication channel.

FIG. 12 illustrates a flow diagram of a routine 1200 for collecting contextual information during a conversation in accordance with an embodiment of the present invention. As described in FIG. 10, the initial contextual information may have been collected and transmitted to the destination service provider (call center) during the connection set-up time. For purpose of discussion, assume that a communication channel has been established between the calling client and the call center (e.g., a contact of the call center, an IVR, etc.).

Beginning at block 1202, after a communication channel is established, the call center and the calling client may continue exchanging contextual information and/or media information (including voice information) over the communication channel. At decision block 1204, a determination is made as to whether there are any changes in the contextual information. If it is determined at decision block 1204 that there is a change in the previously transmitted contextual information, at block 1206, additional information relating to the change may be collected and/or obtained from a proper source. For example, if the additional information is locally available, the additional information is retrieved. Otherwise, the additional information may be obtained from various sources (e.g., other devices of the calling client, service providers, a third party service provider, etc.).

At block 1208, the collected (obtained) contextual information may be transmitted to the call center. At block 1210, a response corresponding to the transmitted contextual information may be received from the call center. In one embodiment, during the conversation, the call center may identify another service necessary or useful to the calling client. In order to provide the identified service, the call center may further collect contextual information from various sources. This may be useful when the calling client does not know about the exact nature of available services, automatic service calls transmitted from a suitable VoIP device, and the like.

Upon receipt of the response, the calling client may not need to continue further conversation, if the initial inquiry for services has been satisfied. In one embodiment, even after the calling client's initial inquiry for services has been satisfied by the response from the call center, the calling client may desire to have further conversation with a contact, an agent, or a sale representative at the call center. Moreover, the calling client may desire to send more inquiries to the call center, and the like. A determination is made as to whether any query for additional information has been received. If any query for additional information has been received, the additional information corresponding to the query may be collected from a proper source. It is to be understood that a query for information can be a part of the response received, or part of subsequently received provider contextual information which request the additional information. Further, the calling client may determine a need for additional information based on the conversation and appropriate information may be identified and collected.

If it is determined at decision block 1204 that there is no change in contextual information, at decision block 1212, a determination is made as to whether any query for requesting additional information has been received. If it is determined at decision block 1212 that a query for additional information has been received, at block 1214, the additional information may be collected. In an illustrative embodiment, when there are multiple sources available for the additional information, the additional information may be collected and/or obtained from each of the multiple sources. Alternatively, the most appropriate source may be determined and contacted. The calling client may have predefined rules or logic to determine an appropriate source for particular information. For example, a GPS server may be one of the appropriate sources for geographic location information of a device equipped with GPS modules. If an individual user's mobile phone can provide the geographic location information of a mobile device, the device may be one of the appropriate sources. Similarly, if a VoIP client maintains geographic location information of devices in local storage, the VoIP client may be one of the appropriate sources. The routine 1200 repeats the above-mentioned steps which include collecting (block

1214), transmitting contextual information (block 1208), and receiving a response (block 1210) until there is no query for additional information.

If it is determined at decision block 1212 that no query for additional information has been received, at decision block 1216, another determination is made as to whether the on-going contextual information routine 1200 should be ended. For example, it may be determined as to whether the call is completed at decision block 1216. If it is determined that the on-going contextual information routine 1200 should be continued, at decision block 1212, the routine 1200 continues to decision block 1204 where a determination is made as to whether any changes have occurred in contextual information. The routine 1200 repeats the steps of collecting (block 1206), transmitting contextual information (block 1208), receiving a response (block 1210) and/or collecting additional contextual information (block 1214) until the call is completed. If it is determined at decision block 1212 that the on-going contextual information routine 1200 should be ended, the routine 1200 terminates at block 1220.

It is to be understood that the embodiments explained in conjunction with the routine 1200 are provided merely for example purposes. In one embodiment, the method of collecting contextual information may also be evolving based on the obtained contextual information. For example, a user's good mood may become bad when an IVRS starts communicating to obtain the additional contextual information. The user's mood can be detected by recognizing cursing words, body heat, tone of voice, stress, and the like. Upon receipt of contextual information relating to the mood change, the service provider may ask whether the user prefers a human operator or a form (GUI) rather than an IVRS. The call center may collect contextual information in accordance with the user selection. Alternatively, the call center may provide a promotion (e.g., coupons, rewards, etc.) to boost the user's mood, or an explanation of the current situation such as a long downtime in waiting for a human operator and the like. It is contemplated that information can be obtained from various sources. For example, if it is determined that the additional contextual information can be available from the calling client, the call center may identify its contextual information which will be used to collect the additional information at the calling client's device. In this example, a set of applications for providing or invoking user interfaces may be identified based on the requested service. The call center's contextual information relating to the set of applications is transmitted to the calling client. As mentioned above, when the calling client already has a set of applications suitable for collecting the additional information, embedded instructions to invoke user interfaces may be transmitted to the calling client. Similarly, when the calling client does not have appropriate applications suitable for collecting the additional information, a set of applications for providing user interfaces may be transmitted to the calling client. The service provider collects the additional information from the calling client.

In an alternative embodiment, the calling client may not allow the call center (or the routed destination) to pull information from any devices of the calling client. In this embodiment, the call center may request the calling client to collect the additional information by identifying the set of applications on the calling client device. The calling client device, in return, collects and transmits the additional information detected while implementing the set of applications. In one embodiment, the additional information needs to be obtained from the third party SPs, the most appropriate third party SP for obtaining the additional information will be determined. In this embodiment, the call center may have predefined provider rules or logic to determine an appropriate source for particular information. Further, the calling client may have provided calling client rules or preferences with respect to determining an appropriate source for particular information. The additional information is obtained from the most appropriate third party SP. In an alternative embodiment, the service provider may obtain the additional information from various third party SPs and generate comprehensive information based on the obtained information.

It is contemplated that upon receipt of a service request, other contextual information, relating to providing such service, may be collected by various VoIP entities including a service provider, a device, a third party service provider, etc., and exchanged. It is also contemplated that any suitable VoIP entities other than the service provider can be responsive to the service request and can provide the requested service. In one embodiment, the requested service may be provided in such a way that the client would not know the service is provided from VoIP entities other than the service provider.

Figure 13:
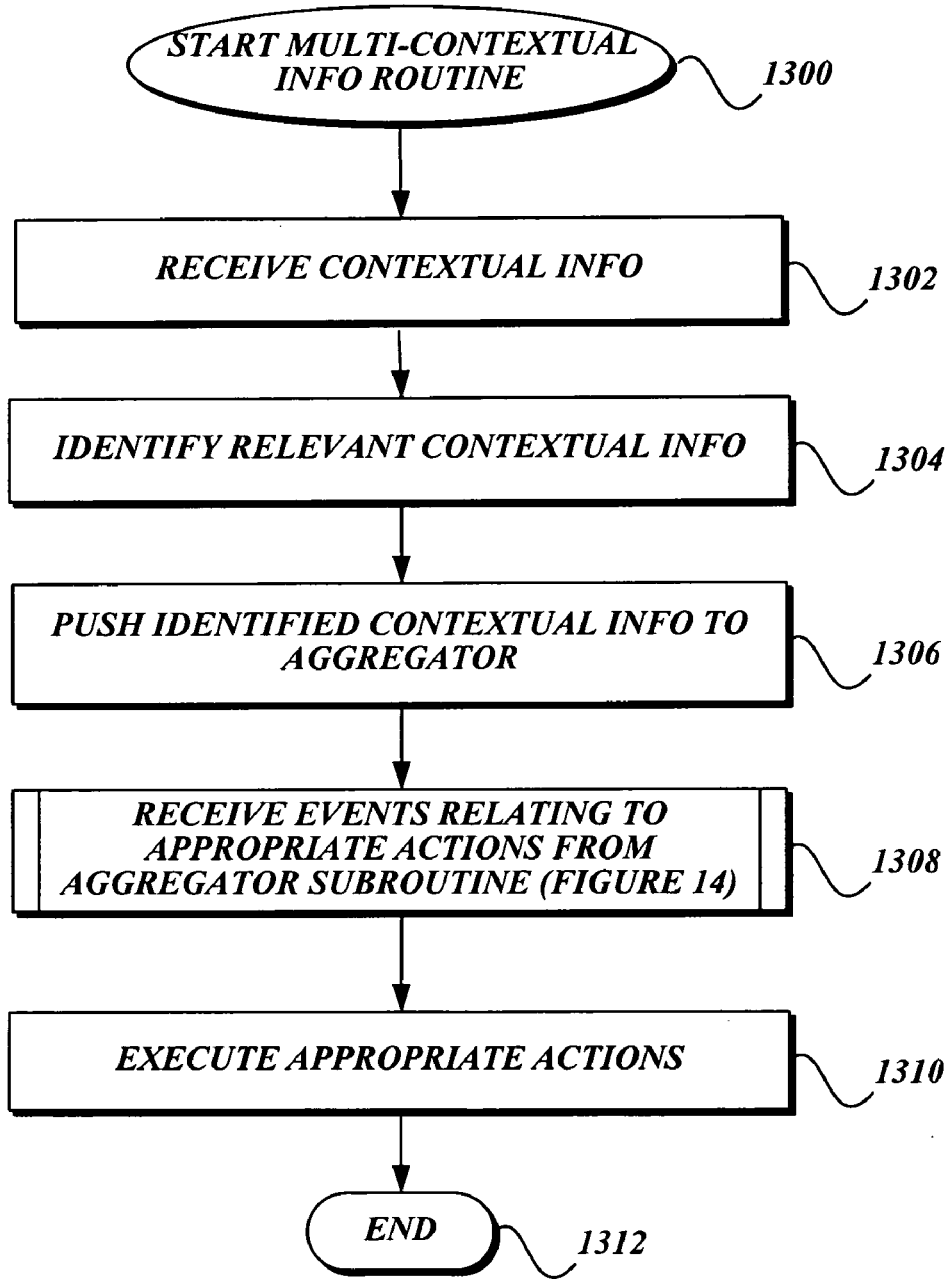
FIG. 13 is a flow diagram illustrating a routine for handling and analyzing multiple sets of contextual information received from several clients in accordance with an aspect of the present invention.

FIG. 13 is a flow diagram illustrating a multi-contextual information routine 1300 for collecting and/or obtaining contextual information from several clients and analyzing the obtained contextual information in accordance with an embodiment of the present invention. As with FIG. 10, assume that several calling VoIP clients (calling clients) may be associated with a call center which is capable of providing customer service for the several callers. A group (first group) of calling clients may transmit service requests to the call center. Each calling client may transmit a signal to initiate a call with one of the contacts (e.g., an operator, an agent, an IVRS, etc.) representing the call center. Another group (second group) of calling clients may exchange conversations with the call center over existing communication channels.

Beginning at block 1302, contextual information may be received from several calling clients. For example, initial contextual information associated with a channel connection may be received from the first group of calling clients, or contextual information as part of conversation may be received from the second group of calling clients. Further, other contextual information may be received from third party service providers and the like. At block 1304, based on predefined factors or rules, any relevant contextual information may be identified from the received contextual information. In one embodiment, when multiple sets of contextual information are received, a common subset of contextual information such as a common subject, similar problems, etc., may be identified as relevant contextual information. For example, when a number of service requesting calls is sharply increased, a certain geographic location of the calling client for the service call may be part of the received contextual information. In this example, the sharply increased rate of the service requesting calls may be one of the predetermined factors to identify the relevant contextual information. The relevant contextual information may be pushed into an agent module (aggregator agent) which may be capable of running in the background, aggregating the contextual information upon receipt of the contextual information, and analyzing the aggregated contextual information.

For another example, when a severe storm hits a certain geographic area, the call center may monitor contextual information relating to calls from clients which reside in the certain geographic area in order to identify problems caused by the storm. The relevant contextual information may be, but is not limited to, geographic location information of the calling client, geographic location information of a device, a keyword, a subject, a reported problem by the calling client, etc. In this example, the relevant contextual information may be further refined in the course of an aggregation process. If the calling client has not provided the relevant contextual information for some reason, the call center may collect or obtain such information from the calling client, other service providers, third party service providers, etc. Alternatively, contextual information related to such calling client may be disregarded from the aggregation process due to lack of the relevant information. At block 1306, the identified contextual information may be pushed to an aggregator agent. As mentioned above, the aggregator agent may a software module which is waiting for contextual information pushed down by the call center and aggregates a part or all of such contextual information. In one embodiment, the aggregator agent may be configured to perform an aggregation process as instructed by the call center. For example, the call center may instruct the aggregator agent by providing predefined logic, predefined factors and rules, predefined sets of criteria and the like. In another embodiment, the aggregator agent further refines the aggregated information if necessary. For example, the aggregator agent may maintain several subsets of the aggregated contextual information for the analysis of the received contextual information. In this example, the aggregator agent may monitor whether each subset of the aggregated contextual information exceeds its corresponding threshold. At block 1308, the call center may receive a set of events from the aggregator subroutine which will be discussed in greater detail below in FIG. 14. The set of events may be generated from the aggregator agent when the aggregator agent identifies some issues or problems based on the aggregated information. For example, the fact that the aggregated contextual information exceeds the threshold may trigger the aggregator agent to generate a set of events for the call center. The set of events may correspond to appropriate actions of the call center based on an analysis of the relevant contextual information. It is contemplated that the threshold corresponding to the aggregated contextual information may be predefined and may be dynamically changed by the call center or other authorized VoIP entities. At block 1310, the appropriate actions may be executed on the set of events. An example of the actions includes, but is not limited to, a notification of a problem commonly experienced in a certain number of clients, an issue discussed with a certain number of clients, a possible solution for the common problem, or the like. The routine 1300 terminates at block 1312.

Figure 14:
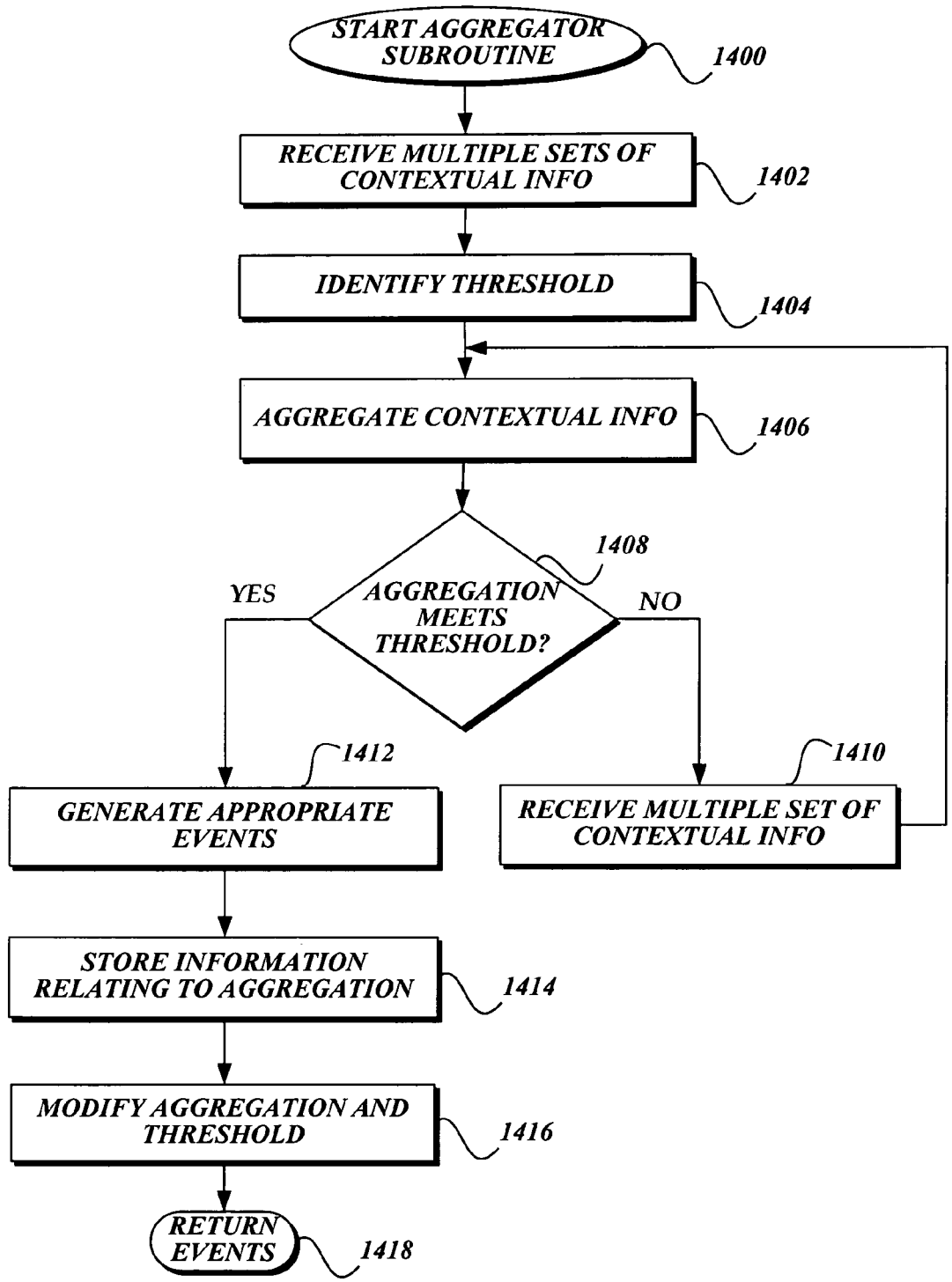
FIG. 14 is a flow diagram illustrating a subroutine for generating a set of events for the call center in response to a predetermined event in accordance with an aspect of the present invention.

FIG. 14 is a flow diagram illustrating an aggregator subroutine 1400 for aggregating contextual information and generating a set of events based on the aggregated information in accordance with an embodiment of the present invention.

For the purpose of discussion, assume that a call center is capable of proving customer services for several calling clients and that the call center further includes an aggregator agent for monitoring multiple sets of the incoming contextual information and generating a set of events for the call center in response to a predetermined event. An example of the predetermined event may be an event in which the aggregated information exceeds its corresponding threshold.

Beginning at block 1402, multiple sets of contextual information from one or more clients may be received from a call center. The received contextual information may be filtered into at least one set of aggregation of contextual information. In one embodiment, only relevant contextual information may be passed through a filter and the relevant contextual information may then be aggregated. In an alternative embodiment, a call center (server) may identify the relevant contextual information and push the relevant contextual information to the aggregator agent. In this embodiment, the aggregator agent may further identify an appropriate set of criteria associated with the relevant contextual information. In one embodiment, several sets of criteria may be predefined based on suitable logic which the call center has chosen to use to analyze multiple sets of contextual information from several calling clients (i.e., multi-party contextual information). By utilizing the appropriate set of criteria, the relevancy in the multiple sets of contextual information may be determined or be refined into a detailed level. The relevant contextual information may be identified and aggregated accordingly. At block 1404, a threshold corresponding to the relevant contextual information may be identified. In one embodiment, a predetermined time period may be associated with the threshold. In this embodiment, the contextual information may be aggregated for the predetermined time period. At block 1406, the relevant contextual information may be aggregated. In one embodiment, while the aggregator agent is aggregating the relevant contextual information, sublevels of relevancy in the relevant contextual information may be identified. In such a case, the aggregation of the relevant contextual information can be evolved and may be divided into several subsets of aggregation. At decision block 1408, a determination is made as to whether the aggregated contextual information (aggregation) meets or exceeds its corresponding threshold. If it is determine at decision block 1408 that the aggregation has not met its corresponding threshold, at block 1410 more contextual information will be received. The routine 1400 repeats the above-mentioned steps to monitor and aggregate contextual information until the aggregation exceeds the threshold. In an alternative embodiment, more contextual information will be received until the timer exceeds the predetermined time. In this embodiment, after the predetermined time expires, the aggregator agent may disregard (clear) the previous aggregation (previously aggregated information) and restart the aggregation process. If it is determined at block 1408 that the aggregation meets or exceeds its corresponding threshold, at block 1412, a set of events corresponding to an analyzed response to the received contextual information may be generated. In one embodiment, the level of the aggregation (e.g., low, medium, high, extreme, etc.) may be monitored. When the aggregation reaches each level, the aggregator agent may generate a different set of events. Upon generating the set of events, information relating to the aggregated contextual information and the aggregation process may be logged and stored as illustrated at block 1414. At block 1416, the aggregation and the corresponding threshold may be cleared (reset) or cached to allow a new analysis to begin.

As mentioned above, the threshold and the set of events may be predefined by the call center or any authorized VoIP entity. Further, the threshold or the set of criteria can be dynamically changed for a different analysis. Additional aggregation may be done in order to analyze the relevant contextual information upon the change in the threshold. It is contemplated that the received contextual information may be analyzed to see whether there is a pattern of similarity. If such pattern is detected, the received contextual information having such pattern is aggregated and, if the aggregation exceeds a corresponding threshold, a set of events is generated. The subroutine 1400 returns the set of events and terminates at block 1418.

Although the illustrative embodiments are described in connection with the routine 1400 and focused on comparing the aggregated contextual information with at least one threshold, it is contemplated that the aggregator agent can use various types of method to aggregate or analyze the aggregation. For example, the aggregator agent may utilize a knowledge base (e.g., a decision tree, etc.) to identify a potential problem or an issue. Likewise, the call center may utilize a knowledge base, a predefined logic, or the like to identify a set of client's contextual information to push to the aggregator agent. It is further contemplated that the aggregator agent can be a background server(s) which periodically collects relevant contextual information from the call center and generates a set of events for the call center's appropriate actions.

While illustrative embodiments have been illustrated and described, it will be appreciated that various changes can be made therein without departing from the spirit and scope of the invention.

The invention claimed is:

1. A method executing on a processor of a computing device for collecting and analyzing contextual information relating to clients of a call center coupled to an aggregator agent, comprising:
    initializing a communication channel between the call center and at least one client; wherein the communication channel is used to transmit contextual data packets and conversational data packets;
    establishing between the call center and the at least one client a predefined structured hierarchy to use to transmit contextual information; wherein the predefined structured hierarchy is used to transmit the contextual information;
    receiving contextual information relating to at least one client; wherein the contextual information is packetized and arranged according to the predefined structured hierarchy;
    receiving other sets of contextual information relating to other clients, the other sets of contextual information sharing at least some common information with the received contextual information;
    identifying relevant contextual information from the received contextual information and the received other sets of contextual information;
    providing the identified contextual information to the aggregator agent that aggregates the relevant contextual information and the other sets of contextual information;
    determining when the aggregated contextual information meets a threshold and based on the determination determining when to receive and aggregate more contextual information in addition to previously collected contextual information;
    during the aggregating, identifying levels of relevancy of the received contextual information and the other sets of contextual information;
    receiving a set of events from the aggregator agent;
    executing actions corresponding to the set of events; and
    clearing the aggregated contextual information and the threshold for a new analysis.

2. The method of claim 1, wherein the set of events is received from the aggregator agent when a threshold associated with the relevant contextual information has been met.

3. The method of claim 2, wherein the executed actions include identifying issues in the contextual information related more than one of the clients.

4. The method of claim 1 further comprising:
    collecting additional contextual information relating to at least one client.

5. The method of claim 1 further comprising:
    receiving multiple sets of contextual information relating to several clients, the multiple sets of contextual information sharing at least some common information.

6. The method of claim 5, wherein the relevant contextual information is identified from the common information.

7. A method executing on a processor of a computing device for aggregating contextual information relating to several clients and analyzing the aggregation, comprising:
    initializing a communication channel between a service provider and at least one client; wherein the communication channel is used to transmit contextual data packets and conversational data packets;
    establishing between the service provider and the at least one client a predefined structured hierarchy to use to transmit contextual information; wherein the predefined structured hierarchy is used to transmit the contextual information;
    receiving multiple sets of contextual information from the at least one client and other clients;
    aggregating the received contextual information;
    determining when the aggregated contextual information meets a threshold and based on the determination determining when to receive and aggregate more contextual information and when to generate an event;
    during the aggregating, identifying levels of relevancy of the received contextual information;
    upon detecting that the aggregated contextual information meets its corresponding threshold, generating an event and clearing the aggregated contextual information and the threshold for a new analysis; and
    providing the generated event.

8. The method of claim 7, further comprising:
    upon generating the event, storing and logging information relating to the aggregated contextual information and the threshold.

9. The method of claim 8, further comprising:
    clearing, storing, or caching the aggregated contextual information and the threshold for a new analysis.

10. The method of claim 7, wherein the threshold is changed for another analysis.

11. The method of claim 7, wherein an appropriate set of criteria is determined to find similarity in the received contextual information.

12. The method of claim 11, wherein the received contextual information with the similarity is aggregated and, if the aggregation meets a corresponding threshold, an event is generated.

13. The method of claim 7, wherein the threshold corresponds to a predetermined period.

14. A storage memory having computer executable components for collecting contextual information relating to several clients and generating an analyzed response to the contextual information, comprising:
    initializing a communication channel between a service provider and at least one client; wherein the communication channel is used to transmit contextual data packets and conversational data packets;
    establishing between the service provider and the at least one client a predefined structured hierarchy to use to transmit contextual information; wherein the predefined structured hierarchy is used to transmit the contextual information;
    an interface component for receiving multiple sets of contextual information from the at least one client and other clients;
    a filtering component for identifying relevant contextual information based on predefined factors including determining an increase in a rate of calls;
    an aggregator component for aggregating the identified contextual information, monitoring the level of aggregation, determining when the aggregated contextual information meets a threshold and based on the determination determining when to receive and aggregate more contextual information and when to generate an event; and upon detecting the level of aggregation meets the threshold, generating a event in accordance with predefined logic;

during the aggregating, identifying levels of relevancy of the received contextual information; and wherein the interface component pushes the identified contextual information to the aggregator component and clears the aggregated contextual information for a new analysis.

15. The storage memory of claim 14 further comprising:
a storage component for storing information relating to the predefined factors, the aggregation, the received contextual information, the event, the value of the threshold and time/date stamps.

16. The storage memory of claim 15, wherein the storage component stores contextual information relating to each client.

17. The storage memory of claim 15, wherein the interface component collects additional contextual information relating to the several clients.

18. The storage memory of claim 15, wherein the filtering component selects an appropriate set of criteria to identify relevant contextual information from the multiple sets of contextual information.

19. The storage memory of claim 18, wherein the appropriate set of criteria and the threshold are dynamically defined.

20. The storage memory of claim 19, wherein upon receipt of a dynamically defined threshold, the aggregator component reevaluates the aggregated contextual information and generates a second event based on the aggregated contextual information.

* * * * *